United States Patent [19]

Barrow et al.

[11] Patent Number: 5,062,036

[45] Date of Patent: Oct. 29, 1991

[54] INSTRUCTION PREFETCHER

[75] Inventors: Arthur Barrow, Acton; Kin L. Cheung, Andover; Jeffrey W. Einarson, Chelmsford; Shams A. Khan, Groton, all of Mass.

[73] Assignee: Wang Laboratories, Inc., Lowell, Mass.

[21] Appl. No.: 333,818

[22] Filed: Apr. 3, 1989

Related U.S. Application Data

[63] Continuation of Ser. No. 743,128, Jun. 10, 1985, abandoned.

[51] Int. Cl.⁵ .......................... G06F 9/38; G06F 9/32; G06F 9/355
[52] U.S. Cl. .............................. 364/200; 364/231.8; 364/243.41; 364/252.6; 364/255.2; 364/262.8; 364/262.81; 364/263.1
[58] Field of Search ... 364/200 MS File, 900 MS File

[56] References Cited

U.S. PATENT DOCUMENTS

| | | | |
|---|---|---|---|
| 3,401,376 | 9/1968 | Barnes et al. | 364/200 |
| 3,408,630 | 10/1968 | Packard et al. | 364/200 |
| 3,930,236 | 12/1975 | Ferguson et al. | 364/200 |
| 4,001,788 | 1/1977 | Patterson et al. | 364/200 |
| 4,005,391 | 1/1977 | MacPherson | 364/200 |
| 4,110,822 | 8/1978 | Porter et al. | 364/200 |
| 4,330,823 | 5/1982 | Retter | 364/200 |
| 4,384,324 | 5/1983 | Kim et al. | 364/200 |
| 4,409,654 | 10/1983 | Wada et al. | 364/200 |
| 4,430,708 | 2/1984 | Isaman | 364/200 |

*Primary Examiner*—Gareth D. Shaw
*Assistant Examiner*—Kakali Chaki
*Attorney, Agent, or Firm*—Michael H. Shanahan; Gordon E. Nelson

[57] ABSTRACT

Instruction prefetching apparatus particularly adapted to executing an EXECUTE instruction specifying a single subject instruction. The apparatus includes a first and second separately-controllable instruction syllable register and control apparatus. Under control of the control apparatus, the first instruction syllable register receives only the first syllable of the prefetched instruction; the second instruction syllable register receives all other syllables. The instruction syllable registers may be loaded either directly from memory or from a data register internal to the CPU. In the first case, the address of the instruction syllable to be prefetched is contained in a special instruction address register which is incremented each time an instruction syllable register is loaded. In the second case, the loading does not affect the value of the instruction address register. Also disclosed is a method of prefetching in which the first instruction syllable is prefetched into the first instruction syllable register and each of the other syllables is prefetched in turn to the second instruction syllable register and a method of executing the EXECUTE instruction in which the syllables of the EXECUTE instruction are prefetched directly from memory using the instruction address and the syllables of the subject instruction are fetched into the data register and from there into the instruction syllable registers.

21 Claims, 11 Drawing Sheets

CPU EMBODYING THE PRESENT INVENTION

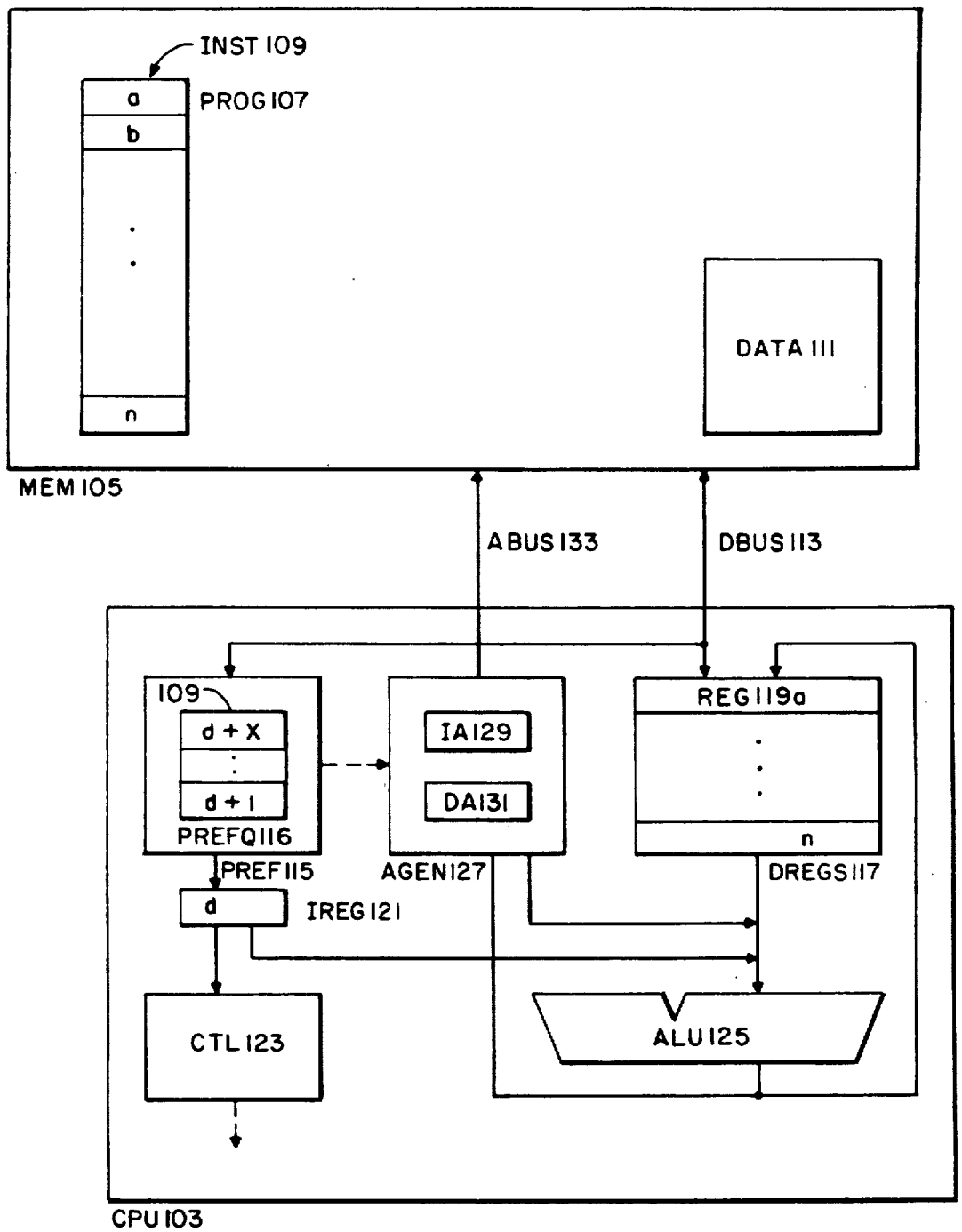
FIG. 1: DIGITAL COMPUTER SYSTEM 101 WITH PRIOR ART PREFETCHER

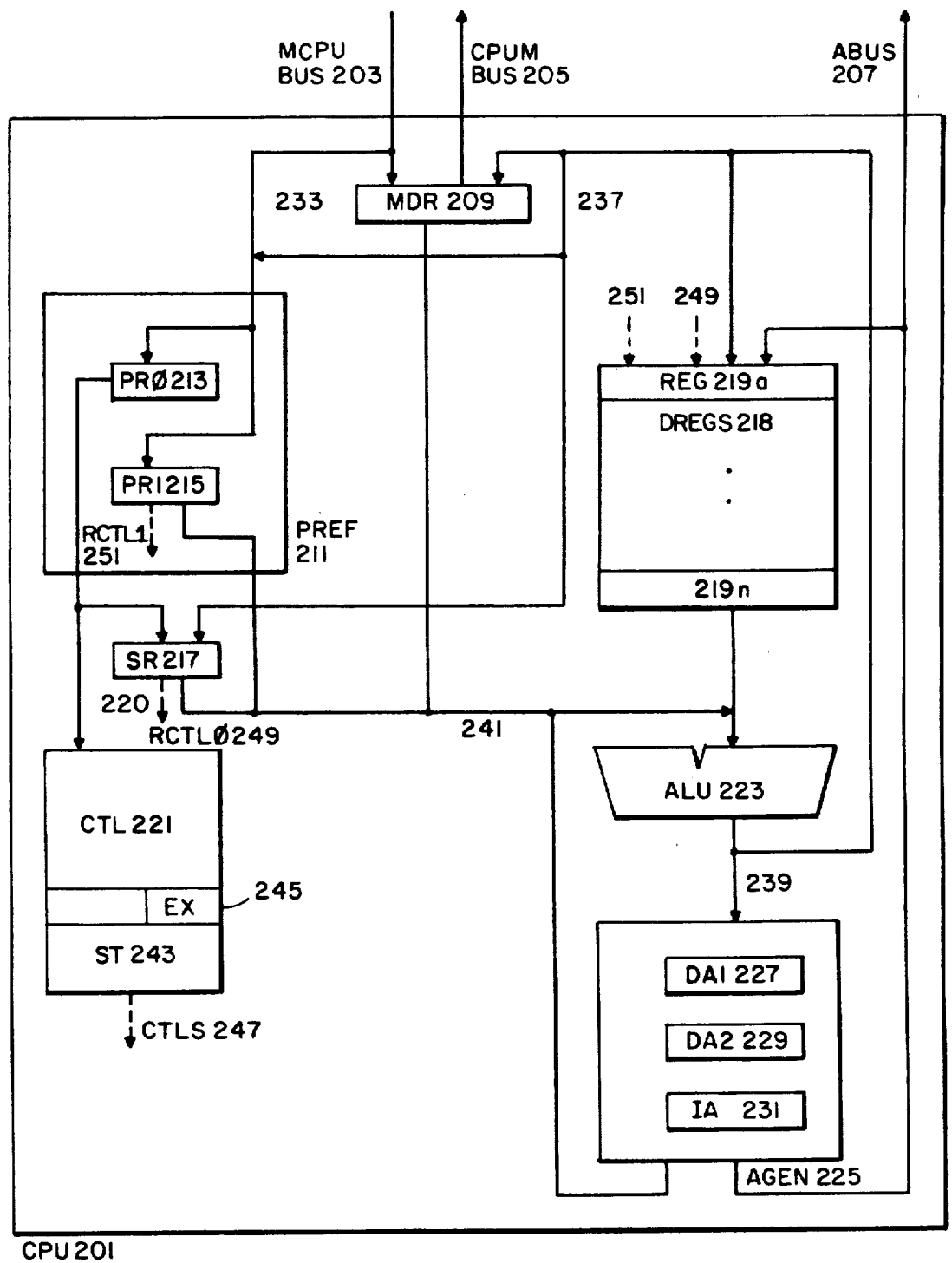
FIG. 2: CPU EMBODYING THE PRESENT INVENTION

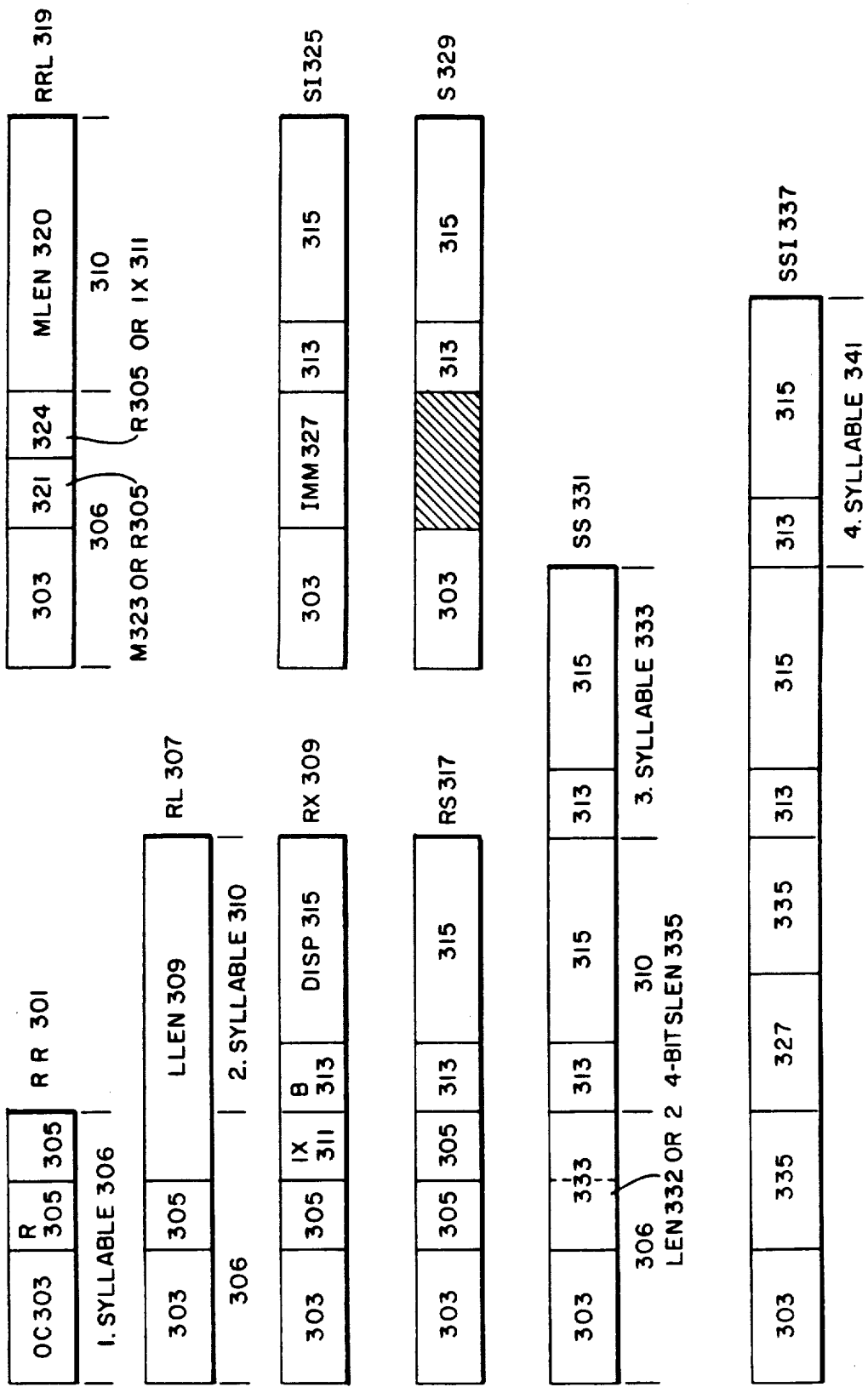
FIG. 3: INSTRUCTION FORMATS

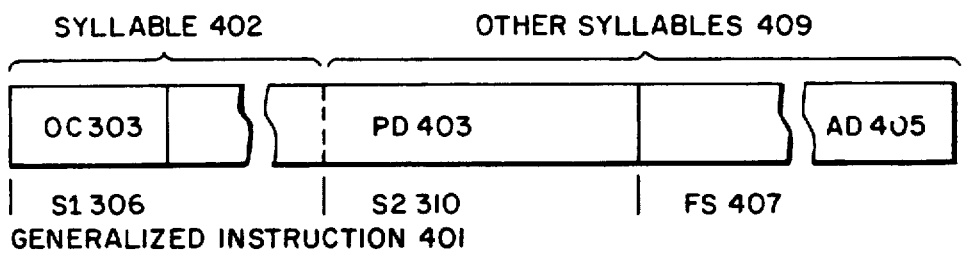
FIG. 4: GENERALIZED INSTRUCTION FORMAT
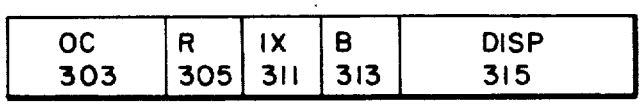
FIG. 5: EX INSTRUCTION 501
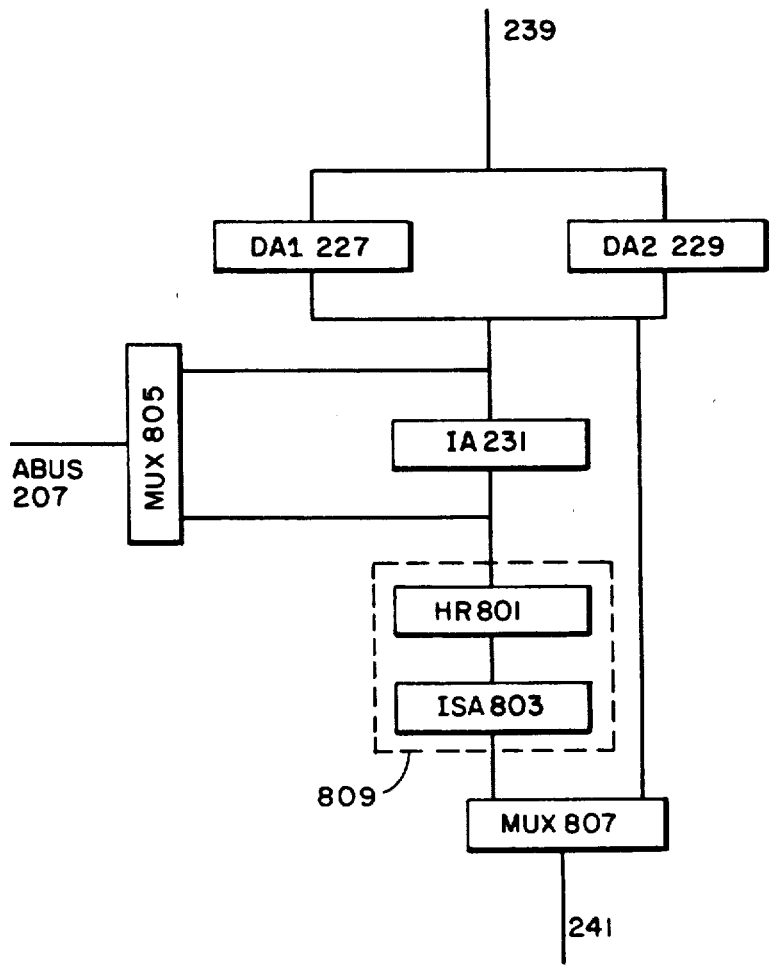
FIG. 8: DETAILED EMBODIMENT OF AGEN 225

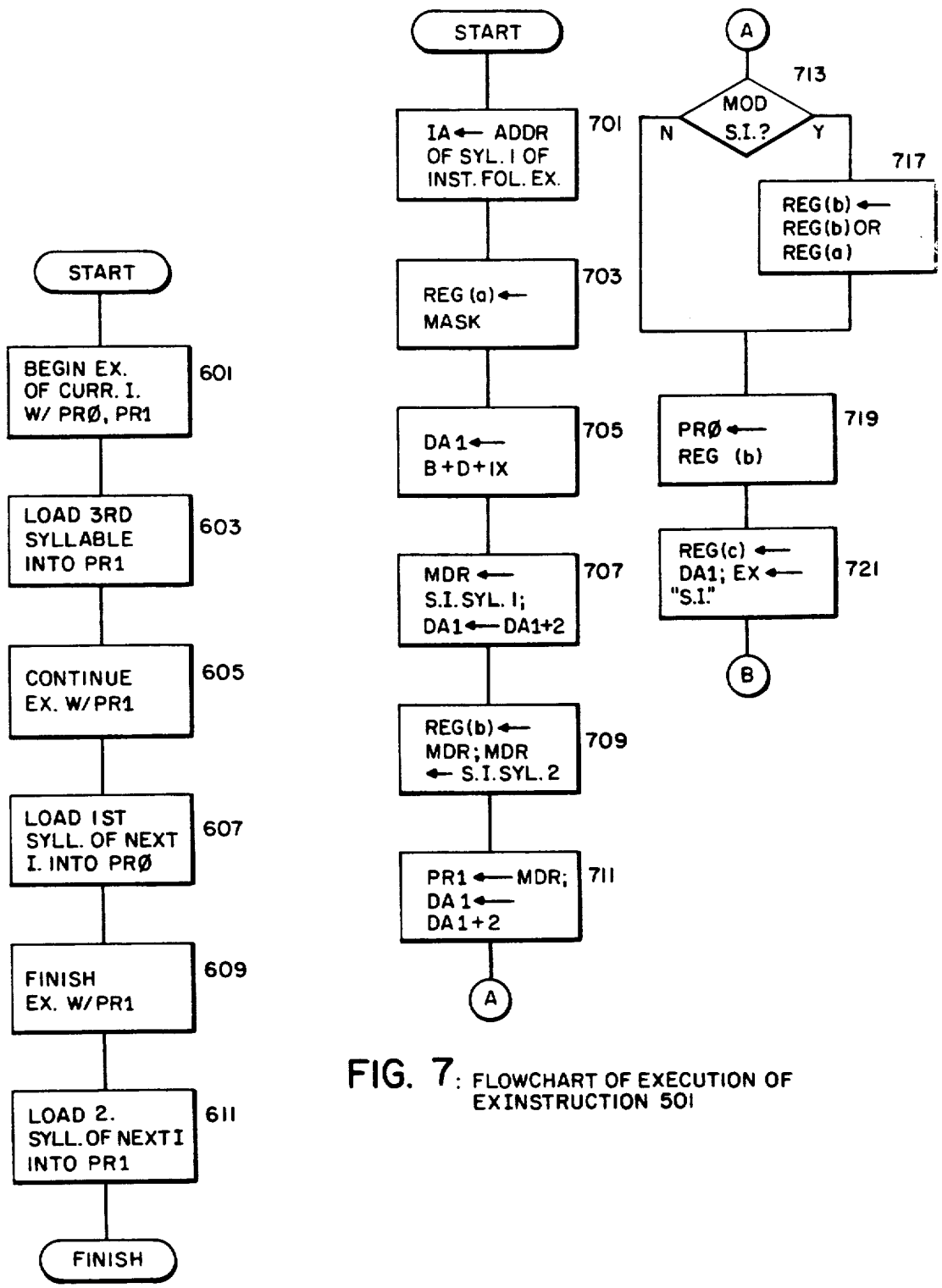
FIG. 7: FLOWCHART OF EXECUTION OF EX INSTRUCTION 501
FIG. 6: FLOWCHART OF PREFETCH OPERATION

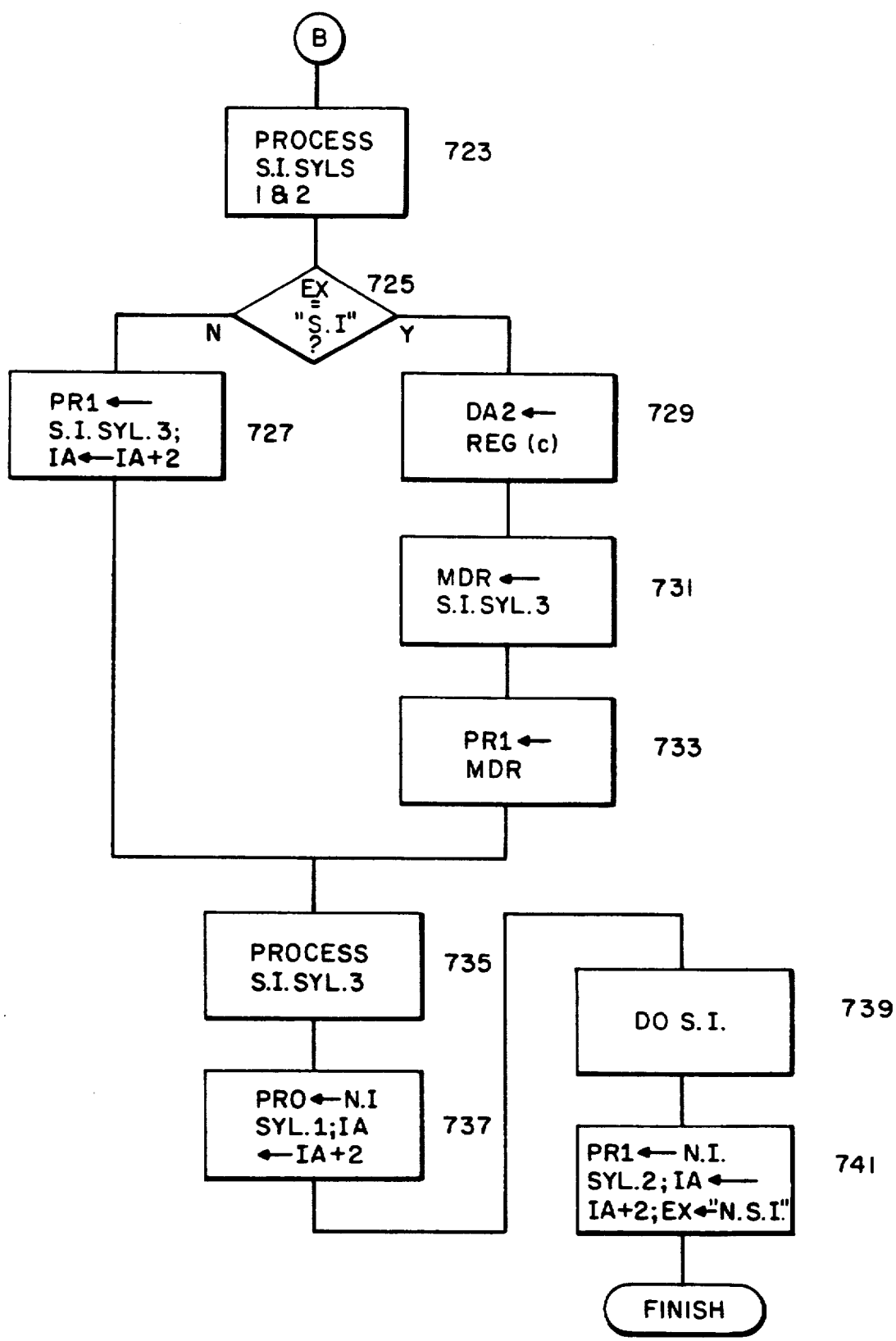
FIG. 7A: FLOWCHART OF EXECUTION OF 3-SYLLABLE SUBJECT INSTRUCTION

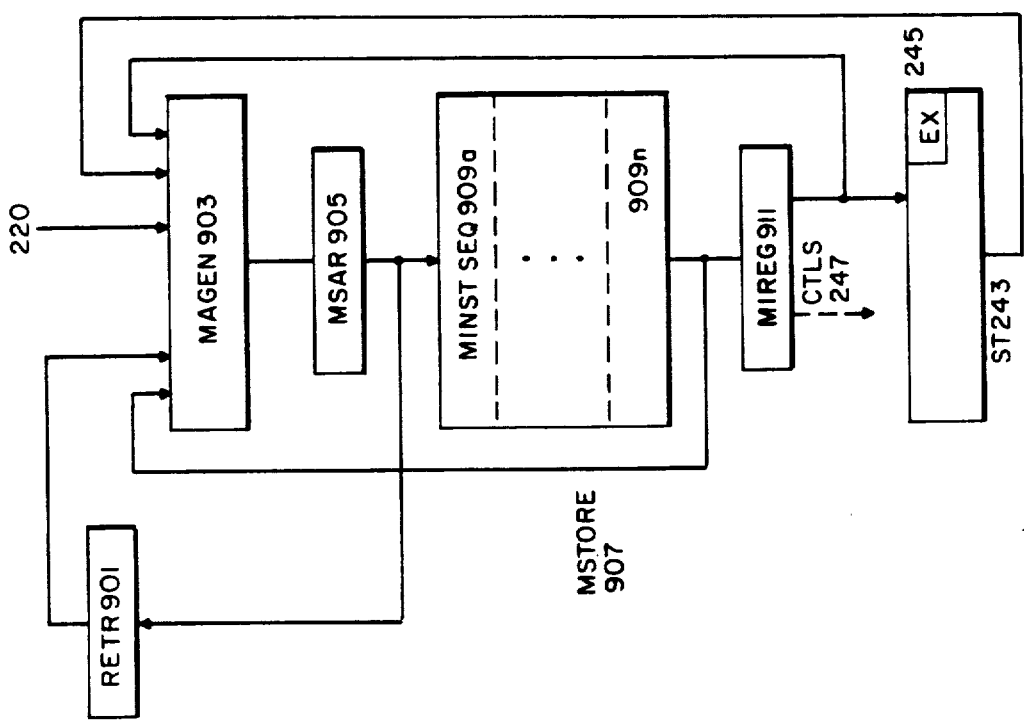
FIG. 10: MICROINSTRUCTION CONTROL FIELDS IN A PREFERRED EMBODIMENT
FIG. 9: DETAIL OF CTL 221

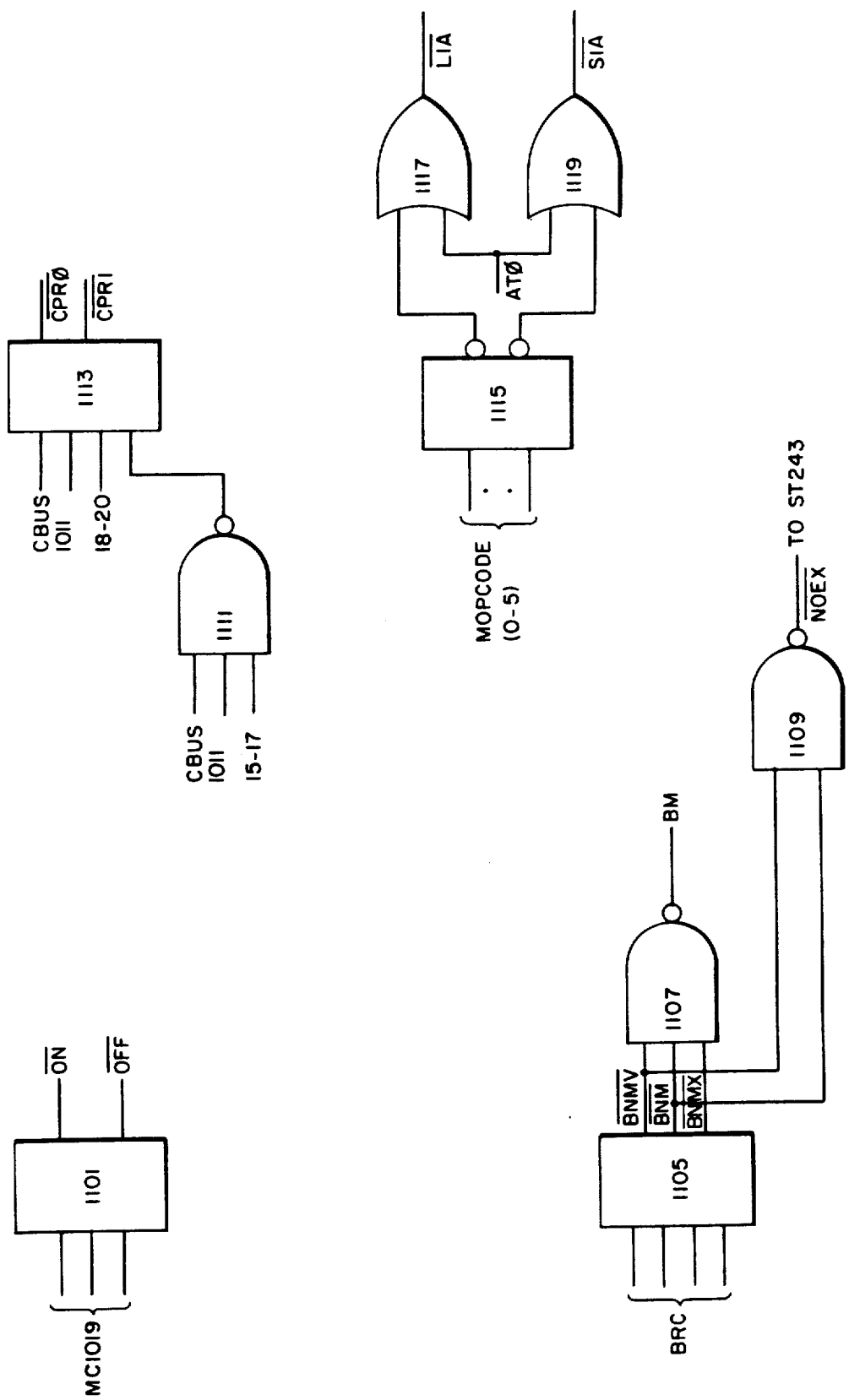
FIG. 11: SIGNALS GENERATED FROM MICROINSTRUCTION 1001

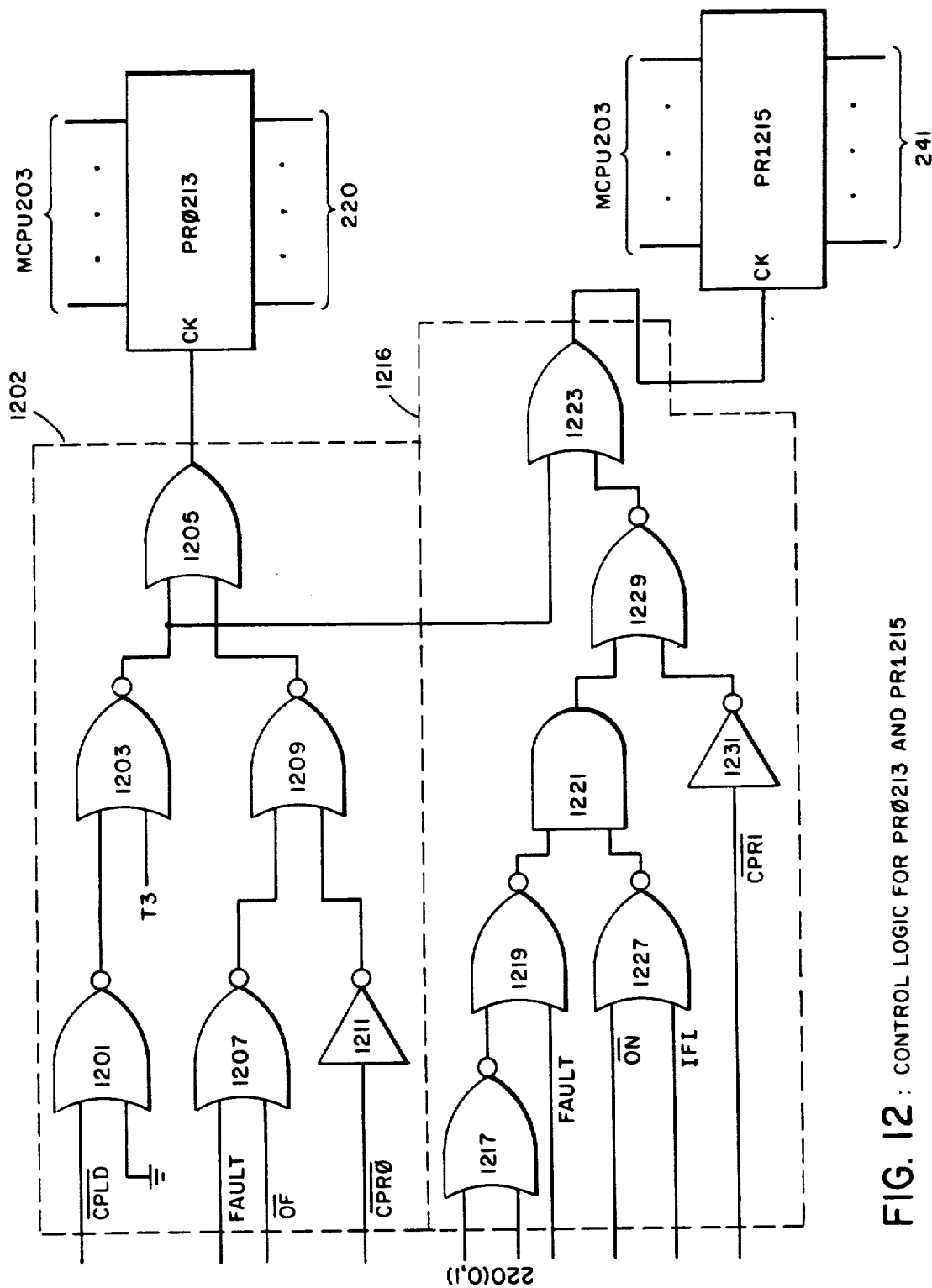
FIG. 12: CONTROL LOGIC FOR PRØ213 AND PR1215

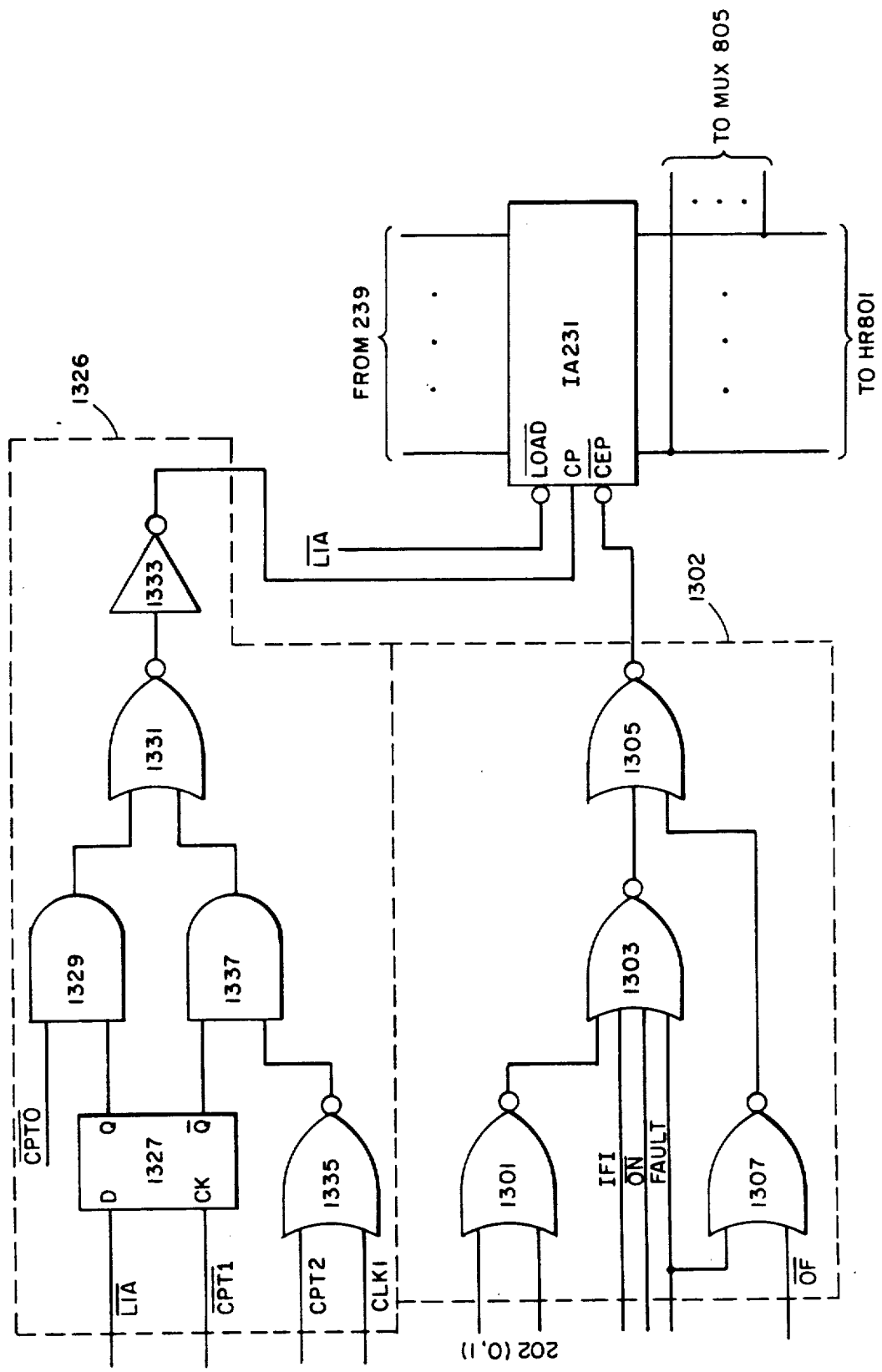
FIG. 13: CONTROL LOGIC FOR IA231

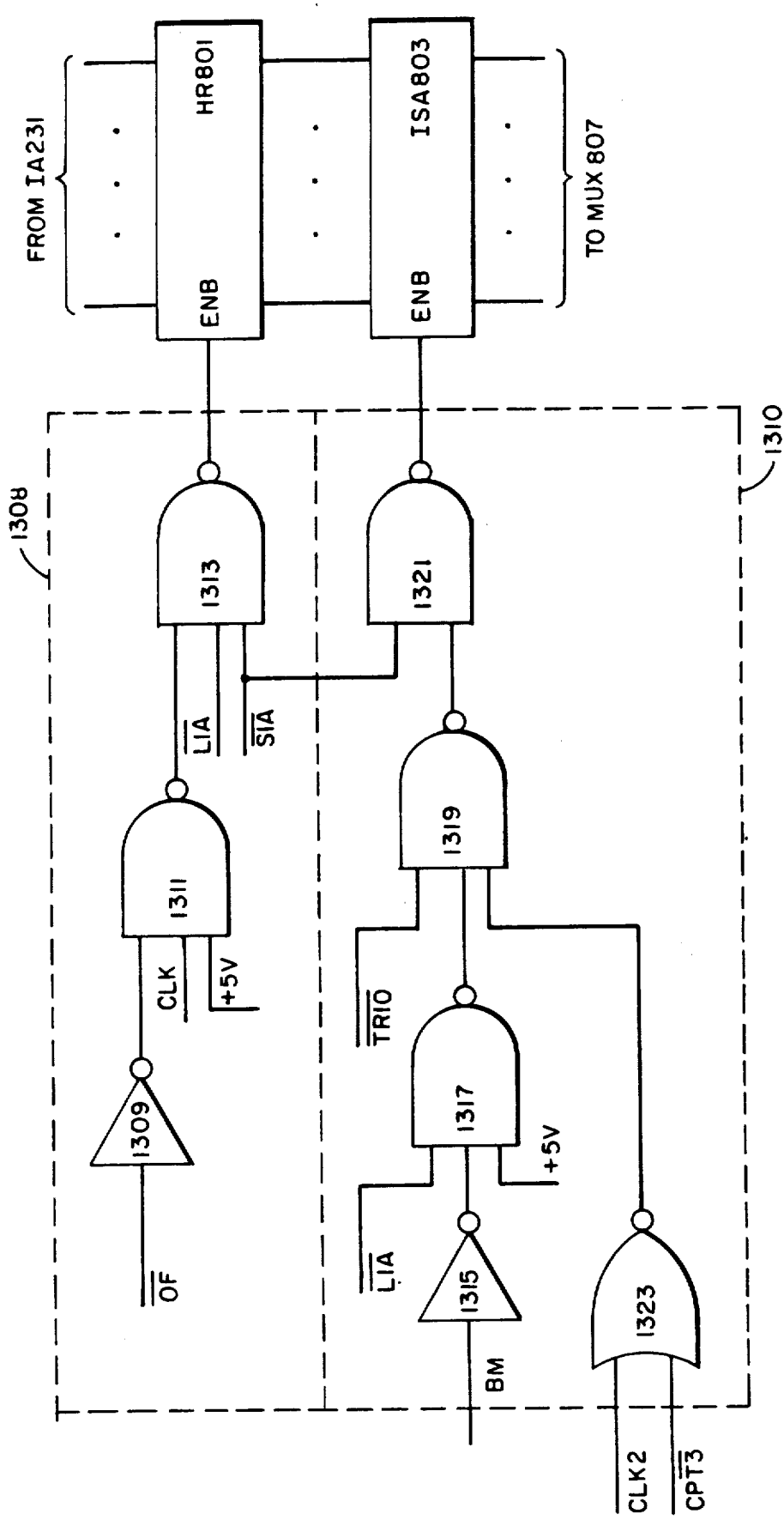
FIG. 13A: CONTROL LOGIC FOR HR801 AND ISA803

INSTRUCTION PREFETCHER

This is a continuation of co-pending application Ser. No. 743,128, filed on June 10, 1985, now abandoned.

BACKGROUND OF THE INVENTION

1. Field of the Invention

The present invention relates to processing units in digital computer systems and more particularly to processing units including instructions prefetch apparatus for fetching an instruction into a processing unit while another instruction is being executed.

2. Description of the Prior Art: FIG. 1

A typical computer instruction includes an operation code specifying an operation and operand specifiers specifying the data to be used in the operation. The execution of such a computer instruction typically involves four different kinds of operations: fetching the instruction from memory, computing the addresses of data in memory, fetching the data from memory, performing the operation specified, and storing the result in a memory location. Of these operations, only fetching the instruction, fetching data from memory and storing data in memory involve the memory. The prior art has long taken advantage of this fact to overlap the execution of the current instruction and the fetching of the next instruction. Whenever the memory is not required during the execution of the current instruction, apparatus termed a prefetcher fetches following instructions from the memory into the prefetcher, where they are retained until used in the CPU. Since the next instruction is available in the prefetcher immediately upon completion of execution of the current instruction, there is no time lost fetching the next instruction from memory and execution of instructions is considerably speeded.

The design of prefetchers is considerably simplified by two characteristics of instructions: they generally are made up of syllables with a uniform size, and they are executed in the sequence in which they are stored in memory unless one of the instructions in the sequence is a branch instruction. Thus, the prefetcher can compute the address of the next syllable to be fetched by simply incrementing the address of the last syllable to be fetched by the syllable size. Because the prefetcher operates in this fashion, the syllables it contains have the same order which they have in memory However, when the execution of a branch instruction causes a program's instructions to be executed in an order other than the one the instructions have in memory, the prefetched instructions must be discarded and the prefetching must begin again with the instruction specified in the branch instruction.

FIG. 1 is a schematic block diagram of a digital computer system 101 with a prior-art prefetcher. The chief components of system 101 are memory (MEM) 105 and CPU 103. MEM 105 contains a program, PROG 107, consisting of a sequence of instructions (INST 109), and data, DATA 111. The instructions are divided into syllables, the first of which contains the operation code. CPU 103 receives data and instruction syllables from MEM 105 via DBUS 113 and provides the addresses of the data and instruction syllables to MEM 105 via ABUS 133. The principal components of CPU 103 are data registers (DREGS) 117, ALU 125, address generator (AGEN) 127, prefetcher (PREF) 115, instruction register (IREG) 121, and control (CTL) CTL 123. All components are controlled by CTL 123. DREGS 117 ar made up of a number of registers (REG) 119. Individual REGs 119 are specified in the following by means of values in parentheses, for example REG(a) 119. REGs 119 may contain DATA 111 from MEM 105 or data generated in the course of the internal operation of CPU 103. DREGS 117 is connected to DBUS 113, and consequently may receive data from or provide it to MEM 105. ALU 125 performs arithmetic and logical operations on data received from DREGs 117, addresses received from AGEN 127, and immediate values received from IREG 121. The results from ALU 125 go to DREGs 117 and AGEN 127. AGEN 127 generates addresses for fetching data and instruction syllables. Because CPU 103 contains a prefetcher, AGEN 127 has at least one register usable for addresses of data, DA 131, and a register usable for addresses of instruction syllables, IA 129. IA 129 operates under control of PREF 115, and DA 131 under control of CTL 123. Addresses from AGEN 127 are provided to MEM 105 via ABUS 133. PREF 115 is connected to DBUS 113 and receives syllables of INSTs 109 via that bus from MEM 105. The syllables are stored in prefetch queue (PREFQ) 116 in the order in which they are fetched from PROG 107 and are read from PREFQ 116 in the same order. IREG 121 contains INST 109 currently being executed in CPU 103. In FIG. 1, that instruction is INST 109 (d). The first syllable of the next instruction, here represented as INST 109 (d+1), is at the head of PREFQ 116. IREG 121 is connected to ALU 125 and CTL 123. The operation code of the current INST 109 goes to CTL 123; immediate values and values used to calculate addresses go to ALU 125. CTL 123, finally, responds to the current INST 109 by providing control signals to the other components as required to perform the operation specified by the instruction.

Operation of PREF 115 in CPU 103 is as already described in general. During execution of an instruction, PREF 115 detects when DATA 111 is not being read from or written to 10 MEM 105 and causes AGEN 127 to output IA 129 to ABUS 133. The syllable of PROG 107 specified by IA 129 is put at the end of PREFQ 116 and IA 129 is incremented to specify the next syllable in PROG 107. The prefetching continues as described until PREFQ 116 is full or until the execution of the current INST 109 results in a branch. In that case, the contents of PREFQ 116 are discarded and IA 129 is set to the address of the next instruction to be executed. Since PREFQ 116 is empty. CPU 103 must wait to begin execution of the next instruction until it has been loaded into PREF 115. As CPU 103 executes the next instruction, other instructions are loaded as previously described.

Prior-art prefetchers have added greatly to the speed of operation of digital computer systems, but have been difficult to design and expensive to build. The design difficulties and expense have been primarily due to the fact that prior-art prefetchers have operated essentially independently of other components of CPU 103. They have consequently required complicated logic to detect when MEM 105 is free to provide INSTs 109, to detect when PREFQ 116 is full or empty, and to deal with branches in the program. A further disadvantage of prior-art prefetchers has been that they have treated all instruction syllables in the same fashion, even though the first syllable of most instructions is functionally quite distinct from the remaining syllables. Descriptions of such prior-art prefetchers may be found at Col. 203 of Bratt, et. al, *Digital Data Processing System Utilizing a Unique Arithmetic Logical Unit* . . . , U.S. Pat. No. 4,445,177, issued Apr. 24, 1984 and in Grondalski, *Apparatus for Fetching and Decoding Instructions*, U.S. Pat. No. 4,462,073, issued July 24, 1984.

Another disadvantage of prior-art prefetchers has been their unfavorable effect on the execution of instructions of the EXECUTE type. This type of instruction, exemplified by the EX instruction of the well-known IBM 360 instruction set, specifies that a single instruction, termed a subject instruction, whose location is specified in the EX instruction, is to be executed, and that when the subject instruction's execution is complete, the instruction following the EX instruction is to be executed. In CPUs with prior-art prefetchers, the EX instruction has been treated as a branch and the execution of the EX instruction and the subject instruction have proceeded as follows: on execution of the EX instruction, IA 129 has been reset to specify the subject instruction and the contents of PREF 115 have been discarded; the subject instruction has then been fetched into PREF 115 and executed; thereafter, IA 129 has been reset to specify the instruction following the EX instruction; the contents of PREF 115 again discarded, and the instruction following the EX instruction fetched into PREF 115. All of this has been done even though by definition, the next instruction to be executed after the subject instruction is the instruction following the EX instruction, and consequently, the prefetcher will work properly if IA 129's value is not changed during execution of the subject instruction.

SUMMARY OF THE INVENTION

The present invention provides a less complex and more effective prefetcher than those found in the prior art. The prefetcher of the present invention has instruction syllable registers for storing prefetched instruction syllables, apparatus for providing an instruction address specifying the next instruction to be prefetched, and control apparatus for controlling the registers and the address providing apparatus. The instruction syllable registers are separately controllable and include a first instruction syllable register which receives only the first syllable of each prefetched instruction and an other instruction syllable instruction register which receives each further syllable of the prefetched instruction. The control apparatus causes the first instruction syllable register to receive and retain the first syllable of the prefetched instruction and the other instruction syllable register to receive and retain the other syllables of the prefetched instruction.

The present invention also provides an improved method of prefetching instructions, namely to prefetch the first syllable of the instruction and retain it in the first instruction syllable register and to prefetch each other syllable of the instruction in return, retaining it in the other instruction syllable register until no longer required for execution of the instruction.

Another feature of the present invention is that it provides a particularly efficient implementation of instructions of the EXECUTE type. In the present invention, the instruction syllable registers in the prefetcher may be loaded without changing the instruction address. The control apparatus responds to the EXECUTE instruction by causing the instruction syllable registers to fetch the first two syllables of the subject instruction into the syllable registers without changing the instruction address. Thus, the instruction address continues throughout execution of the subject instruction to specify the first syllable of the instruction following the EXECUTE instruction and need not be reset after completion of execution of the subject instruction.

In a further feature of the invention, certain subject instructions have more syllables than can be contained in the instruction syllable registers. This situation is dealt with by means of an EX status bit in the control apparatus. While responding to the EXECUTE instruction, the control apparatus sets the EX status bit. When executing an instruction having more syllables than will fit in the instruction syllable registers, the control apparatus determines from the EX status bit whether the instruction is a subject instruction. If it is, the control apparatus continues to cause the instruction syllable registers to fetch syllables without changing the instruction address as described above. Otherwise, it causes the instruction syllable registers to fetch syllables and increments the instruction address as previously described.

The present invention finally provides an improved method for executing EXECUTE instructions. In the method, an instruction address is set at the beginning of execution of the EXECUTE instruction to specify the instruction following the EXECUTE instruction. The subject instruction is then loaded into the prefetcher without altering the instruction address. During execution of the subject instruction, the instruction following the EXECUTE instruction is prefetched using the instruction address.

It is thus an object of the invention to provide an improved data processing system;

It is a further object of the invention to provide an improved prefetcher in the CPU of a data processing system;

It is another object of the invention to provide a prefetcher which is simpler than those of the prior art;

It is an additional object of the invention to provide a prefetcher with separately-controllable syllable registers;

It is a still further object of the invention to provide an improved method for prefetching instructions;

It is yet another object of the invention to provide a prefetcher which is particularly adapted to execution of the EXECUTE instruction;

It is a further additional object of the invention to provide an improved method for executing the EXECUTE instruction.

Other objects and advantages of the present invention will be understood by those of ordinary skill in the art after referring to the detailed description of a preferred embodiment and the drawings, wherein:

BRIEF DESCRIPTION OF THE DRAWINGS

FIG. 1 is a block diagram of a digital computer system including a prior-art prefetcher;

FIG. 2 is a block diagram of a CPU embodying a prefetcher of the present invention;

FIG. 3 is a diagram of the formats of the instructions executed by the CPU in a preferred embodiment of the invention;

FIG. 4 is a diagram of a generalized format for instructions executed by the CPU in a preferred embodiment of the invention;

FIG. 5 is a diagram of the EX instruction executed by the CPU in a preferred embodiment of the invention;

FIG. 6 is a flowchart of the prefetch operation performed by the invention;

FIG. 7 is a flowchart of the execution of the EX instruction using the method of the invention;

FIG. 7A is a flowchart of the execution of a three-syllable subject instruction using the method of the invention. FIG. 8 is a detailed block diagram of AGEN 225 of FIG. 2; FIG. 9 is a detailed block diagram of CTL 221 of FIG. 2; FIG. 10 is a diagram of the control fields in microinstruction 1001 in a preferred embodiment;

FIG. 11 is a schematic showing how certain signals are generated from microinstruction 1001 in a present embodiment;

FIG. 12 is a schematic showing the control logic for PRO 213 and PR1 215 in a present embodiment;

FIG. 13 is a schematic showing the control logic for IA 231 in a preferred embodiment; and FIG. 13A is a schematic showing the control logic for HR 801 and ISA 803 in a preferred embodiment.

Reference numbers employed in the drawings have two parts; the lefthand portion of the number is a figure number indicating the figure in which the element first appears; the righthand portion is a two-digit element number identifying the element in the figure. Thus, the element number 207 refers to element 7 in FIG. 2, while the element number 1311 refers to element 11 in FIG. 13.

DESCRIPTION OF A PREFERRED EMBODIMENT

The Description of a Preferred Embodiment begins with a general discussion of the prefetcher of the present invention and its operation and then provides a detailed description of a preferred embodiment of the prefetcher.

1. A CPU Containing the Prefetcher of the Present Invention: FIG. 2

Beginning the general discussion of the prefetcher with FIG. 2, that figure shows a CPU 201 embodying the prefetcher. Features of CPU 201 which are well-known in the art and not directly concerned with the present invention have been substantially simplified in FIG. 2 for purposes of clarity. In particular, the structure of DREGS 218, bus 239, and bus 241 are more complex in a present embodiment than shown in FIG. 2.

CPU 201 is connected via MCPU bus 203, CPUM bus 205, and ABUS 207 to a memory of a type well-known in the art (not shown) which contains data and programs made up of instructions executable by CPU 201. ABUS 207 transfers addresses from CPU 201 to the memory, and in response to the addresses and control signals from CPU 201, the memory either receives data from CPU 201 on CPUM bus 205 or provides it to CPU 201 on MCPU bus 203.

The major components of CPU 201 are Memory Data Register (MDR) 209 Data Registers (DREGS) 218, ALU 223, Address Generator (AGEN) 225, Prefetcher (PREF) 211, Specifier Register (SR) 217, and Control (CTL) 221. MDR 209 receives data from and provides data to the memory. In a present embodiment, MDR 209 contains 2 bytes of data. MDR 209 is connected via MCPU bus 203 and CPUM Bus 205 with the memory and outputs data via bus 241 to ALU 223. DREGS 218 consists of a set of registers (REG) 219(a) through (n), used for storing data including addresses during operation of CPU 201. In a present embodiment, certain of REGs 219 are specifiable in the instructions executed by CPU 201 and others are available only for internal use of CPU 201. Registers specifiable by instructions are controlled by control signals RCTLO 249 and RCTLI 251; all registers are further controlled by CTLS 247 from CTL 221. DREGS 218 outputs data via bus 241 to ALU 223 and receives data via bus 239 from ALU 223 and via ABUS 207 from AGEN 225. AGEN 225 receives data via bus 239 from ALU 223 and outputs addresses via ABUS 207 to the memory. A connection from AGEN 225 to bus 241 further permits outputs from AGEN 225 to be input to ALU 223 for purposes of address calculation. AGEN 225 contains three address registers, Data Address 1 (DA1) 227, Data Address 2 (DA2) 229, and Instruction Address (IA) 231. DA1 227 and DA2 229 contain addresses for data to be fetched from memory to MDR 209 or written from memory to MDR 209. IA 231 contains the address of the next instruction syllable to be fetched directly from memory to PREF 211.

PREF 211 receives instruction syllables directly from memory via MCPU Bus 203 and from bus 239 via bus 237. The latter path permits loading of instructions from memory into PREF 211 via MDR 209, bus 241, ALU 223, bus 239, and bus 237. PREF 211 contains two registers for instruction syllables: Prefetch 0 (PR0) 213, which may only receive the first syllable of an instruction, and Prefetch 1 (PR1) 215, which receives all other syllables of the instruction. In a present embodiment, PR1 215 contains only a single syllable, and consequently receives the other syllables sequentially. Both PR0 213 and PR1 215 may receive instruction syllables either directly from memory or from bus 239. PRO 213 outputs the operation code from the first syllable to CTL 221 and the remaining portions of the first syllable to SR 217, where they are retained during execution of the instruction. SR 217 provides control signals RCTLO 249 to DREGS 218 and is further connected via bus 241 to ALU 223's inputs and bus 237 to ALU 223's outputs. Data from SR 217 may thus be provided to ALU 223, modified, and returned to SR 217. PR1 215 provides control signals RCTLI 251 to DREGS 218 and data to ALU 223 via bus 241.

CTL 221 receives the operation code from the first syllable of the instruction stored in PRO 213 and provides CTLS 247 to the other components of CPU 201, including PREF 115 and to the memory as required to perform the operation specified by the operation code and prefetch the first two syllables of the next instruction. CTL 221 includes Status Register (ST) 243, which contains bits indicating the status of the memory and of various components of CPU 201. ST 243 operates in a manner well-known in the art to modify the operation specified by the operation code of the instruction being executed as required by the status specified by the bits in the status register. For the present discussion, only one status bit, indicated in FIG. 1 as EX 245, is germane. This bit is set by the EXECUTE instruction and remains set until the subject instruction has been executed.

2. Instructions Executed by CPU 201: FIGS. 3 and 4

FIGS. 3 and 4 illustrate the formats of instructions executed by CPU 201. Beginning with FIG. 4, that figure shows the general format of the instructions. Each instruction 401 consists of at least one syllable 402. In a present embodiment, syllable 402 is 16 bits long; other lengths are, however, possible. The first syllable of the instruction, S1 306, differs from the other syllables 409 in that it contains the operating code, OC 303. The information contained in an instruction 401 falls into three general classes: Operation Code (OC) 303, which specifies the operation which CPU 201 performs in response to instruction 401, Processing Data (PD)

403, which specifies immediate values and internal registers to be used in executing instruction 401, and Addressing Data (AD) 405, from which the addresses in memory of data used in the operation may be calculated. All instructions 401 contain at least OC 303 and PD 403. In instructions having a single syllable, that first syllable (S1) 306 contains both OC 303 and PD 403; in longer instructions, PD 403 may additionally be contained in second syllable (S2) 310, which may also contain AD 405, but in no case do Following Syllables FS 407 contain anything but AD 405. Of this information, OC 303 and PD 403 must be available at beginning of execution of instruction 401; AD 405 is required only when the addresses are calculated. For example, if an instruction specifies an operation in which data is stored in memory only at the end of the operation, AD 405 specifying the address is not needed until the end of the operation. Because of these differences in the times at which information is required, execution of any instruction 401 having more than two syllables 402 may begin as soon as the first two syllables 402 are available and the remaining syllables 402 may be fetched during execution of the instruction.

Continuing with FIG. 3 which illustrates the formats of instructions 401 employed in a present embodiment, it will be seen that there are 9 classes of instructions, having lengths ranging from 1 to four syllables. What class an instruction belongs to depends on the kinds of PD 403 it contains and the amount of AD 405. The kinds of PD 403 are the following:

R 305 specifies a REG 219; the register may be either a source of or a destination for data used in the operation.

LLEN 309, MLEN 320, LEN 332, and SLEN 335 are values used in executing instructions. They may specify the length of a data item or a branch offset. Sizes range from 20 bits for LLEN 309 through 4 bits for SLEN 335.

IX 311 specifies a REG 219 which contains an index value used in address calculation.

M 323 specifies a mask value which is used to mask a condition code which controls whether a conditional branch is taken.

IMM 327 contains immediate data used in the operation specified by OC 303.

AD 405 contains pairs of base register specifiers B 313 and displacement values DISP 315. B 313 specifies a register in DREGS 218 which contains an address; DISP 315 contains a value which, when added to a base value contained in a register, produces an address. A B 313-DISP 315 pair may be used by itself to produce an address or the address may be produced using a B-313-DISP 315 pair and IX specifier 311. In the former case, the value represented by DISP 315 is added to the value contained in the register specified by B 313 to produce the address; in the latter case, it is produced by adding the value contained in the register specified by B 313, the value contained in the register specified by IX, and the value represented by DISP. As may be seen from FIG. 3, an instruction may contain one or two B 313-DISP 315 pairs.

3. Operation of PREF 211 During Execution of an Instruction: FIG. 6

The manner in which the present invention operates may best be seen by describing the execution of an example instruction 401 having three syllables. The instruction chosen is the MVC instruction, which is used to move a character string of a specified length from one location in memory to another location in memory. The MVC instruction has format SS 331; beginning after OC 303, the fields are LEN 332, which specifies the length in bytes of the character string being moved, and two B 313-D 315 pairs, the first of which specifies the address to which the string is to be moved and the second of which specifies the address from which the string is to be moved.

During execution of the instruction preceding the MVC instruction, CTL 221 caused PR0 213 to be loaded with the first syllable of the MVC instruction and PR1 215 to be loaded with the second syllable. Addresses for the loading operation were provided by IA 231, which incremented itself to point to the next syllable after providing the address for the syllable being loaded into PREF 211. Thus, at the beginning of execution of the MVC instruction, syllable 1 is in PR0, syllable 2 is in PR1, and IA 231 is set to the address of syllable 3.

On conclusion of execution of the preceding instruction, CTL 221 causes PR0 213 to output OC 303 from syllable 1 to CTL 221 and LEN 332 to SR 217. In response to OC 303, CTL 221 causes PR1 215 to output DISP 315 to ALU 223 and B 313 of the second syllable as RCTLO 249 to DREGS 218, to which DREGS 218 responds by outputting the contents of the REG 219 specified by B 313 to ALU 223, where the value of DISP 315 is added to the contents of the specified REG 219 to produce the address of the destination for the string. The address is then stored in DA1 227 of AGEN 225. Next, CTL 221 moves the value of LEN 332 from SR 217 to a REG 219 and fetches the third syllable of the instruction into PR1 215. As previously described, it does so using the address in IA 231, and thereupon increments the address, so that it now specifies the first syllable of the instruction following the MVC instruction. Thereupon, CTL 221 causes PR1 215 to output B 313 and DISP 315 from the third syllable to DREGS 218 and ALU 223 and ALU 223 computes the address of the second operand as previously described. The address is loaded into DA2 229. Thus, at this stage, the address of the first operand is in DA1 227, the address of the second operand is in DA2 229, and the number of bytes of data to be moved is in a REG 219.

Next, CTL 221 causes PR0 213 to load the first syllable of the instruction following the MVC instruction and causes IA 231 to increment itself so that it specifies the second syllable of the following instruction. Thereupon, the actual move begins. It is executed as a loop in which two bytes of data at the location specified by DA1 227 are fetched from memory into MDR 209, DA1 227 is incremented to specify the location following the fetched bytes, and the length value is decremented by 2. Then the two bytes in MDR 209 are written to the memory location specified by DA2 229, DA2 229 is incremented to specify the location following the stored bytes, and the length value is checked to see whether it is less than 0. If it is not, the move is not yet finished, and the loop is repeated. If it is, the move is complete and the loop terminates. On termination, CTL 221 loads the second syllable of the next instruction into PR1 215, increments IA 231, and commences execution of the next instruction as described above.

Execution of instructions 401 having other formats is analogous. For example, when an instruction with RR format 301 is executed, the entire instruction is contained in PR0 213 and is output at beginning of execution to CTL 221 and SR 217. The register specifiers R 305 output to SR 217 generate signals RCTLO 249 controlling operation of DREGS 218, and the data in the specified REGS 19 is operated on by ALU 223.

FIG. 6 is a generalized flowchart for the operation of PREF 211 during execution of any instruction 401 having 3 syllables. As described for MVC and shown in box 601, at the beginning of execution of the instruction 401, PR0 213 contains the first syllable and PR1 215 the second syllable. Execution begins using OC 303, PD 403, and any AD 405 in the first and second syllables. Thereupon, as shown in box 603, the third syllable is loaded into PR1 215 and execution continues using the AD 405 in the third syllable. While execution is continuing, the first syllable of the next instruction 401 is loaded into PR0 213, and at the end of execution, the second syllable of the next instruction is loaded into PR1 215. It may easily be seen from the flowchart of FIG. 6 how the invention may be employed for instructions 401 having two syllables or more than three syllables. For instructions 401 having more than three syllables, other steps analogous to those shown in boxes 603 and 605 are inserted before box 607; for instructions 401 having two syllables, steps 603 and 605 are omitted.

Instructions 401 having one syllable. i.e., those with RR format 301, present special problems. If PR0 213 and PR1 215 are loaded and IA 231 are advanced as described above, execution of the instruction 401 with RR format 301 will begin with the instruction 401 in PR0 213, the first syllable of the next instruction 401 in PR1 215, and IA 231 specifying the second syllable of the next instruction 401, and the second syllable, instead of the first, will be prefetched into PR0 213. As will be explained in more detail later, this result is avoided in a present embodiment as follows: in the instructions 401 of a present embodiment, only OCs 303 of instructions having RR format 301 have the value 00 in the two leftmost bit positions. When the two leftmost bit positions in PR0 213 have that value, PR1 215 is inhibited from loading and IA 231 is inhibited from incrementing. Consequently, when the syllable fetched in step 607 is a instruction with RR format 301, step 611 of flowchart 6 is without effect and at beginning of execution of an instruction 401 having RR format 301, only PR0 213 is loaded and IA 231 specifies the first syllable of the instruction following the instruction 401 with RR format 301.

4. Operation of PREF 211 During Execution of an EX Instruction: FIGS. 5, 7, and 7A As already explained, an EX instruction is one which specifies the execution of a single subject instruction. FIG. 5 shows the form of EX instruction 501 in a preferred embodiment. Instruction 501 has RX format 309. Following OC 303, there are R 305, IX 311, B 313, and DISP 315. If R 305 has a value other than 0, the specified REG 219 contains a mask used to modify bits 8–15 of the subject instruction prior to execution. As can be seen from FIG. 3, those bits contain register specifiers, length specifiers, immediate data, or mask specifiers, and any of these can thus be modified before execution. The modifications do not affect the copy of the subject instruction in memory. The remaining three fields are used to compute the address of the subject instruction. Both B 313 and IX 311 specify REGs 219, and the address is the sum of the values in the specified REGs 219 and the value of DISP 315.

EX instruction 501 in a present embodiment is executed as shown in FIG. 7: At the start of execution of EX instruction 501, PR0 213 contains the first syllable of instruction 501, PR1 215 contains the second syllable, and IA 231 is set to the address of the first syllable of the instruction following EX instruction 501 (block 701). As described in the foregoing discussion of instruction execution, the first syllable of instruction 501 goes to CTL 221 and SR 217. CTL 221 first saves the value contained in REG 219 specified by R 305 in another REG($a$) 219 (block 703) and then employs IX 311 from SR 217 and B 313 and DISP 315 from PR1 to provide the contents of the specified registers in ALU 223 an compute the address of the subject instruction by adding the contents of the register specified by B 313, the contents of the register specified by IX 311, and the value of DISP 315. The address is stored in DA1 227 (block 705).

Next, CTL 221 fetches the first syllable of the subject instruction into MDR 209 and increments DA1 227 so that it specifies the second syllable (block 707). CTL 221 then moves the first syllable into REG(b) 219 and fetches the second syllable into MDR 209 (block 709); thereupon, CTL 221 moves the second syllable via bus 241, ALU 223, bus 239, and bus 237 from MDR 209 to PR1 215 and increments DA1 by 2 (block 711). Next, CTL 221 checks the value saved in REG(a 219) to determine if a register other than 0 was specified (block 713). If it was, CTL 221 retrieves the saved first syllable of the subject instruction and the saved mask, ORs them in ALU 223, and returns the result to REG($b$) 219 (block 717). Then, CTL 221 moves the first syllable as modified from REG($b$) 219 to PR0 213 via the path described above (block 719).

Finally, CTL 221 prepares for execution of the subject instruction by saving the address of the subject instruction's next syllable, contained in DA1 227, in REG($c$) 219 and setting EX bit 245 in ST 243 to indicate that the next instruction to be executed will be a subject instruction (block 721). Thus, at beginning of execution of the subject instruction, the first two syllables of the subject instruction are in PR0 213 and PR1 215, IA 231 still specifies the address of the instruction 401 following the EX instruction 501, the address of the next syllable of the subject instruction is stored in a REG 219, and EX bit 245 specifies a subject instruction. While individual steps of the method shown in FIG. 7 are dependent on the components of CPU 201, the general principle involved, namely, that the syllables of the subject instruction are fetched into PREF 211 without altering the value of IA 231, is applicable to any CPU in which the prefetcher can be loaded independently of setting the address the prefetcher uses to prefetch instructions.

As may be seen from FIG. 7A, execution of the subject instruction proceeds generally as previously described. However, if the subject instruction has more than 2 syllables and EX bit 245 indicates that the instruction being executed is a subject instruction (block 725), CTL 221 loads the following syllables into PR1 215 as follows: first, the address of the next syllable of the subject instruction which was saved in REG($c$) 219 is loaded into DA2 229 (block 729), then, using the address, the next syllable is fetched into MDR 209 (block 731), and finally, it is moved from MDR 209 to PR1 215 (block 733). If there is a fourth syllable, DA2 229 is incremented to specify that syllable, and it is fetched and loaded into PR1 215 as just described. Execution of the subject instruction finishes as previously described (blocks 735–741). Before the next instruction is executed, EX 245 is reset to indicate no subject instruction (block 741). Since IA 231 is unaffected by the loading of the subject instruction into PREF 211, when the syllables of the following instruction are prefetched during execution of the subject instruction using IA 231, the result is that the first and second syllables of the instruction following the EX instruction 501 are prefetched (blocks 737, 741). Further, since IA 231 is unaffected by the loading of the subject instruction, there is no need to make special provision for subject instructions having a single syllable.

5. Detailed Description of AGEN 225 in a Preferred Embodiment: FIG. 8

FIG. 8 is a block diagram of AGEN 225 in a preferred embodiment of the invention. AGEN 225 in this embodiment includes three address registers. DA1 227, DA2 229, and IA 231, whose functions have already been explained. In a preferred embodiment, DA1 227. DA2 229, and IA 231 are implemented by means of loadable counters which may be incremented in response to a signal from CTL 221. Thus, an address loaded into one of these registers may be incremented by means of a signal from CTL 221. AGEN 225 additionally includes MUXes 805 and 807 and means 809 for retaining the address of the first syllable of the instruction currently being executed. Address retention means 809 includes two registers Hidden Register (HR) 801 and Instruction Start Address (ISA) 803.

The inputs of DA1 227 and DA2 229 are connected to the output of ALU 223, from whence they receive the results of address calculations. The outputs of DA1 227 and DA2 229 are connected to the input of IA 231, to MUX 805, whose output is connected to ABUS 207, and to MUX 807, whose output is connected to bus 241; the output of IA 231 is connected to MUX 805 and the input of HR 801; the output of HR 801 is connected to the input of ISA 803, and the outputs of ISA 803 and DA1 227 and DA2 229 are connected to bus 241, permitting return of the contents of ISA 803, DA1 227, and DA2 229 to ALU 223 for further address computation. The components of AGEN 225 operate under control of signals from CTL 221. The signals govern loading of the registers, selection of a source for the output of MUXes 805 and 807, selection of output from DA1 or DA2, and incrementing of DA1 227, DA2 229, and IA 231.

Operation of AGEN 225 may be divided into the suboperations of loading, incrementing, providing addresses to the memory, providing addresses to ALU 223, and operations involving IA 231. DA1 227 and DA2 229 are loaded from the output of ALU 223 via bus 239. ALU 223 may receive the values it uses to compute the loaded address from DREGS 218, SR 217, PR1 215, DA1 227, DA2 229, or ISA 803. IA 231 is loaded from either DA1 227 or DA2 229. As regards incrementing, addresses in CPU 201 in a present embodiment specify 8-bit bytes of data, and DA1 227 and DA2 229 may be incremented by either 1 or 2. Incrementing by 1 is used where the unit of data being fetched or stored is a byte, as for example in the MVC instruction explained earlier. Incrementing by 2 is used where the unit being fetched or stored is a 16 bit half word. IA 231 may be incremented only by 2, since instructions 401 in a present embodiment have 16-bit syllables.

Output from AGEN 225 is controlled by MUXes 805 and 807. MUX 805 controls output to ABUS 207, and thus the source of addresses sent to memory. When data is being fetched from memory to MDR 209 or written from MDR 209 to memory, the source of the address is either DA1 227 or DA2 229, and consequently, MUX 805 selects the output from those registers. When instructions are being fetched from memory to PREF 211, MUX 805 selects the output from IA 231. MUX 807 controls output to bus 241, and thus the source of addresses sent from AGEN 225 to ALU 223. The address may be either a data address, stored in either DA1 227 or DA2 229, or the address of the beginning of the current instruction, stored in ISA 803. As will be explained in more detail below, the latter address is used during execution of a branch instruction to compute the address of the next instruction to be executed.

Continuing with operations involving IA 231 IA 231 need be loaded only when the next instruction to be executed is not the instruction following the current instruction. The situations in which this can occur in a present embodiment are when the current instruction is a branch instruction, an EX instruction, or a subject instruction. In the cases of the branch instruction and the EX instruction, the current instruction specifies the data to be used in computing the address of the next instruction. CTL 231 controls computation of the address in ALU 223, and the result is output to either DA1 227 or DA2 229. CTL 231 then loads IA 231 from whichever of DA1 227 or DA2 229 contains the result. Once IA 231 is loaded, it is incremented by 2 after each operation prefetching an instruction syllable directly from memory to PREF 211. When the instruction syllable being fetched is the first syllable, CTL 221 further loads the value of IA 231 into HR 801, which thus preserves the address of the first syllable of the prefetched instruction after IA 231 has been incremented to specify the instruction's next syllable. When execution of the prefetched instruction begins, the address in HR 801 is loaded into ISA 803, where it is available for input to ALU 223. When the prefetched instruction is a relative branch instruction, i.e., one in which the location of the instruction being branched to is computed by adding a value to the address of the branch instruction, the address in ISA 803 is output to ALU 223, where it is used to compute the address of the next instruction.

An example of the operation of AGEN 225 is provided by the manner in which the branch on condition (BC) instruction is implemented in a present embodiment. The instruction has RX format 309 and has the following fields following OC 303: a mask (M) field 323 which specifies the mask for the condition code which controls whether the branch will be taken, an IX field 311, a B field 313, and a DISP field 315. These fields specify the address of the instruction 401 which s to be executed if the condition specified for the branch is fulfilled.

At beginning of execution, the first syllable of the BC instruction is in PR0 213 and the second in PR1 215, IA 231 contains the address of the instruction 401 following the BC instruction, and ISA 803 contains the address of the BC instruction. CTL 221 receives OC 303 and SR 217 receives M field 323 and IX field 311. CTL 221 first causes PREF 211 to fetch the first syllable of instruction 401 following the BC instruction into PR0 213, increments IA 231, and uses M field 323 to determine whether the branch should be taken. If it is not to be taken, CTL 221 causes PREF 211 to fetch the second syllable of the following instruction into PR1 and begins execution of that microinstruction. If it is to be taken, CTL 221 uses the values in the REGs 219 specified by IX 311 and B 313 and the value of DISP 315 to calculate the address of the next instruction 401 to be executed in ALU 223. The result is output to DA1 227. Next, CTL 221 loads IA 231 from DA1 227 and ISA 803 from IA 231. CTL 221 then prefetches the first syllable of the next instruction 401 to be executed into PR0 213, loads HR 801 with the current value of IA 231, and increments IA 231 to specify the second syllable of the next instruction 401. Finally, CTL 221 prefetches the second syllable of the next instruction 401 into PR1 215, increments IA 231, loads ISA 803 from HR 801, and begins execution of next instruction 401.

An example of how ISA 803 is used to calculate the address of the next instruction 401 in certain branch instructions is provided by the branch on condition relative instruction (RBC) of the present embodiment. That instruction has RL format 307; following OC 303 there are M 323 and LLEN 309, which in the RBC instruction contains a value which, when added to the address of the RBC instruction, yields the address of the next instruction 401. Execution of the RBC instruction proceeds as described for the BC instruction, except that the address of the next instruction 401 is calculated by providing the address of the RBC instruction from ISA 803 and LLEN 309 from SR 217 and PR1 215 to ALU 223. The result appears in DA1 227, and the rest of the RBC instruction is executed as described above for BC.

6. Detailed Description of CTL 221 in a Preferred Embodiment: FIGS. 9 and 10 CTL 221 in a preferred embodiment controls operation of CPU 201 by executing sequences of microinstructions. Bit settings in fields in the microinstructions directly control operation of the components of CPU 201 FIG. 9 is a block diagram of the means employed in CTL 221 to store and execute microinstructions. The main components of CTL 221 are microinstruction store (MSTORE) 907, which stores sequences of microinstructions (MINST SEQ) 909(a) through (n) and outputs a microinstruction in response to a microaddress, microinstruction register (MIREG) 911, which holds the microinstruction currently being executed and provides CTLS 247 to the components of CPU 201, ST 243, which contains status bits to which CTL 221 responds, microaddress generator (MAGEN) 903, which generates the address of the next microinstruction to be output from MSTORE 907 and executed, microinstruction address register (MSAR) 905, which retains the address of that microinstruction, and return register (RETR) 901, which saves the return address when one microinstruction sequence invokes another.

The microinstructions executed by CTL 221 in a preferred embodiment are shown in FIG. 10. Microinstruction 1001 is 48 bits long and has three main regions: POP 1003 (bits 0-20), MOP 1013 (bits 21-29), and BROP 1023 (bits 30-47). Processor operations (POP) 1003 specifies the registers in CPU 201 which are to serve as sources and destinations for data operated on by ALU 223 and the operations performed by ALU 223. For example, transfer of data from MDR 209 to PRO 213 via bus 242, ALU 223, bus 239, and bus 237 is an POP operation. Memory operations (MOP) 1013 specifies operations which transfer data between memory and MDR 209 and between memory and PREF 211. Branch operations (BROP) 1023 specifies conditions under which a branch to another sequence of microinstructions will be taken and the location to which the branch will be made. All of the operations specified by POP 1003, MOP 1013, and BROP 1023 in a given microinstruction are performed in a single microcycle. For example, in the single microcycle, CPU 201 may perform an operation involving ALU 223, prefetch an instruction syllable from memory, and branch to another microsequence. Each of these main regions is further subdivided. POP 1003 contains microopcode (MOPCODE) 1005, which specifies the kind of operation, ABUS 107, which specifies one source of data for the ALU, BBUS 1009, which specifies another source of data for the ALU, and CBUS 1011, which specifies the destination for the result of the operation.

Operations specified by POP 1003 which are of special interest for the present discussion include the following:

BD, which calculates an address from B 313, DISP 315, and IX 311 by outputting values from the specified REGs 219 to ALU 223 and combining them with DISP 315 from PR1 215 to produce the address, which is output to DA1 227 or DA2 229.

REL, which calculates a branch address by adding an offset obtained from SR 217 and PR1 215 to the value of ISA 803 and outputs the result to DA1 227 or DA2 229.

LIA, which loads the address contained in DA1 or DA2 into IA 231 and ISA 803

SIA, which transfers the contents of IA 231 to either DA1 227 or DA2 229

LDA, which transfers the contents of either DA1 227 or DA2 229 to a register in DREGS 218.

SDA, which transfers the contents of a register in DREGS 218 to DA1 227 or DA2 229.

In the SIA operation, the contents of IA 231 are moved to DA1 227 or DA2 229 via HR 801, ISA 803, MUX 807, bus 241, ALU 223, and bus 239.

MOP 1013 contains data address select (DAS) 1015, which selects either DA1 227 or DA2 229 as the source of the address output to memory on ABUS 207, Data Address Ripple (DAR) 1017, which specifies whether whichever of DA1 227 or DA2 229 is selected is to be incremented by 0, 1, or 2, memory command (MC) 1019, which specifies the kind of memory operation, and CC 1021, which specifies how the condition code used in macroinstruction branches is to be set. The memory operations which may be specified using DAs 1015, DAR 1017, and MC 1019 include the following which are of special interest in the present discussion:

Operations involving MDR 209:

nRm+p: Read a byte or half word using DA1 227 or DA2 229 from memory to MDR 209 and increment. n specifies either DA1 227 or DA2 229, m specifies whether a byte or half word is being read, and p specifies the increment Thus, 2R1+1 specifies that a byte is to be read using the address in DA2 229 and DA2 229 is to be incremented by 1.

nWm+p: Write a byte or half word from MDR 209 to memory using DA1 227 or DA2 229 and increment. n, m, and p have the same significance as with the R operation.

Operations involving PREF 211:

OF: fetch the instruction syllable specified by IA 231 from memory into PR0 213, load the present value of IA 231 into HR 801, and increment IA 231 by 2.

ON: fetch the instruction syllable specified by IA 231 from memory into PR1 215 and increment IA 231 by 2.

BROP 1023 has two subfields: BRC 1025, which specifies a branch command, and BRAD 1029. The meaning of the latter field depends on the kind of branch command; for some commands, it is unused; for others, it contains a microaddress, for others, it specifies which of the bits in ST 243 controls the branch, a mask, and a microaddress, and for one, it specifies an operation to be performed on a bit in ST 243. Branch commands of interest to the present discussion are the following:

BNM, branch to the next microsequence. This command ends execution of an instruction 401. EX 245 is set to indicate no subject instruction, the address of the next microsequence is generated using OC 303 in PR0 213, SR 217 is loaded from PR0 213, IA 231 is loaded from HR 801, and execution of the microsequence specified by OC 303 in PR0 213 begins.

BNMX, branch to the next microsequence after execution of an EX instruction 501. This command sets EX to indicate that the next instruction is a subject instruction and otherwise proceeds in the same fashion as BNM.

Conditional branches depending on the value of EX bit 245 in ST 243.

CTL 221 operates as follows: Acting as determined by BROP field 1023, MAGEN 903 computes the address of the next microinstruction to be executed. Values used for the computation may come from BRAD field 1029 of the microinstruction currently being executed, from status bits in ST 243, from RETR 901, and from OC 303 in PR0 213 a bus 220. The address is output to MSAR 905 and from there to MSTORE 907. The microinstruction 1001 specified by the address is output to MIREG 911, where it generates CTLS 247 which control operation of CPU 201 for one microcycle. At the end of the microcycle, MAGEN 903 again provides the address computed in response to BROP field 1023 to MSAR 905 and the next instruction is executed as just described.

As may be seen from the foregoing discussion, a preferred embodiment of CTL 221 is capable of causing CPU 201 to perform the actions described in the flowcharts of FIGS. 6 and 7. As regards the flowchart of FIG. 6, the OF operation prefetches the first syllable of an instruction into PR0 213 and the ON operation prefetches the other syllables of the instruction into PR1 215 and the BNM operation begins execution of the prefetched syllables. As regards the flowchart of FIG. 7, the OF and ON operations performed during the execution of the instruction preceding the EX instruction guarantee that IA 231 will contain the address of the instruction following the EX instruction. The R operation permits an instruction syllable to be fetched from memory to MDR 209 and the register transfer operations specified by POP 1003 permit transfer of the instruction syllable from MDR 209 to PR0 213 or PR1 215, so that PREF 211 can be loaded with subject instruction syllables without affecting IA 231. The LDA and SDA operations permit transfer of addresses between DREGS 218 and DA1 227 and DA2 229, the BNMX and BNM branch commands permit setting and clearing of EX 245, and the conditional branches depending on the value of EX bit 245 permit fetching of a third or fourth syllable of a subject instruction without altering IA 231

7. Implementation of PR0 213 and PR1 215 in a preferred embodiment: FIGS. 11 and 12

FIGS. 11 and 12 show a preferred implementation of PR0 213 and PR1 215 and the logic controlling their operation. Beginning with FIG. 11, that figure shows certain decoding logic which decodes fields of the microinstruction 1001 currently contained in MIREG 911.

Only that decoding logic which is relevant to the present invention is shown. Beginning with decoder 1101, that decoder receives the three bits of MC 1019 and decodes them to produce signals including NOT ON and NOT OF (here and in the following, NOT is used where an overscore appears over a signal name in the figures). Decoder 1101 responds to MC 1019 by giving NOT OF the value logical 0 when MC 1019 specifies an OF operation and 1 when it does not, and NOT ON has the value logical 0 when MC 1019 specifies a ON operation and 1 when it does not.

Continuing with decoder 1105 and gates 1107 and 1109, decoder 1105 responds to the four bits of BRC to give the NOT BNM signal the value 0 when the BRC specifies a BNM operation and otherwise the value 1 and to give the NOT BNMX signal the value 0 when the BRC specifies a BNMX operation and otherwise the value 1. NOT BNMV is generated when BRC specifies another branch operation which is not further relevant here. NAND gate 1107 gives the BM signal the value 1 whenever any of its inputs has the value 0, i.e. whenever BRC indicates a BNM, BNMX, or BNMV operation. NAND gate 1109, finally, gives the NOT NOEX signal the value 0 whenever the branch operation is neither a BMNV operation nor a BMN operation, i.e., when it is a BMNX operation. The inverted value of NOT NOEX in turn sets EX bit 245 in ST 243. Thus, the BMNX operation sets EX 245 and the BMN and BMNV operations reset it.

NAND gate 1111 and decoder 1113 respond to CBUS field 1011 of microinstruction 1001 to produce the signals NOT CPR0 and NOT CPR1, which control loading of PR0 213 and PR1 215 respectively from bus 237. The signals have the value 0 when the respective registers are to be loaded and otherwise the value 1. Decoder 1115 and NOR gates 1117 and 1119 respond to bits 0-5 of MOPCODE 1005 to produce the signals NOT LIA and NOT SIA, which respectively control loading of IA 231 from one of DA1 227 or DA2 229 and storing of IA 231's contents in one of DA1 227 or DA2 229. Loading or storing occurs when the respective signal is low. As may be seen from FIG. 11, timing of NOT LIA and NOT SIA is determined by timing signal ATO at OR gates 1117 and 1119. When the output from decoder 1115 to OR gate 1117 is high, NOT LIA is high regardless of the value of ATO; when the output is low, NOT LIA is low only when ATO is low. Decoder 1115, OR gate 1119, and ATO regulate the value of NOT SIA in the same fashion.

Continuing with FIG. 12, that figure shows the logic which controls loading of PR0 213 and PR1 215. The logic controlling PR0 213 is contained in box 1202 and that controlling PR1 215 is contained in box 1216. In a present embodiment, PR0 213 and PR1 215 are each implemented by means of a pair of IC's, each of which contains 8 D flip flops which are loaded in response to an edge at input CK. The edge is provided by timing signal T3, an input to NOR gate 1203. T3 can provide the edge to PR0 213 and PR1 215 only if the other input to NOR gate 1203 is 0. That input comes from NOR gate 1201, which has one input tied low and the signal NOT CPLD as the other input. Thus, if NOT CPLD is low, no timing signal is provided to PR0 213 and PR1 215 and the registers cannot be loaded. NOT CPLD comes from the memory and is low when memory operations do not permit loading of data from memory into MDR 209, PR0 213, and PR1 215.

As regards PR0 213, timing signal T3 also cannot provide the edge needed to load PR0 213 if the other input to OR gate 1205 is high. That input is the output of NOR gate 1209, and is low if either input to NOR gate 1209 is high. One input, from inverter 1211, is high whenever NOT CPR0 is low, i.e., whenever PR0 213 is being used as a destination for data from ALU 223. Thus, in this situation, T3 provides the edge needed to load PR0 213. The other input, from NOR gate 1207, is high only if both inputs to NOR gate 1207 are low. The first input, FAULT, is low unless a protection fault has occurred, and the second, NOT OF, is low when the OF operation has been specified. Thus, T3 will provide the edge to PR0 213 when the OF operation occurs in absence of a protection fault. In situations other than when NOT CPR0 is low or when NOT OF and FAULT are low, the output of NOR gate 1209 is high, changes in T3 do not affect the output of OR gate 1205, and PR0 213 is not loaded.

The control logic for PR1 215 works in substantially similar fashion. The CK input in PR1 215 comes from OR gate 1223, which has the output of gate 1203 as one input. T3 thus provides the edge for loading PR1 215 and loading of PR1 215 is inhibited by a low value for NOT CPLD in the same fashion as for PR0 213 The other input of gate 1223 comes from NOR gate 1229, and thus, T3 can provide the edge only if one or the other of the inputs to gate 1229 has the value 1. The input from inverter 1231 has that value if signal NOT CPR1 is low, i.e., if PR1 215 is being used as a destination for data from ALU 223. The other input comes from AND gate 1221, which has a high output only if both of its inputs are high. One input is from NOR gate 1227. That input is high only if both NOT ON and IFI are low. NOT ON is low when an ON operation has been specified and IFI is low when there is no address translation fault on the memory reference which fetched the instruction being loaded. The other input is from NOR gate 1219, which in turn takes its inputs from the FAULT signal and NOR gate 1217, which has as its inputs the leftmost two bits of the current contents of PR0 213. NOR gate 1219's output is high only if neither FAULT nor the output of 1217 is high, i.e., only if there is no protection fault and the two leftmost bits of the current content are not 00. The latter situation occurs, as previously explained, when the instruction being fetched has the RR format and is therefore only 1 syllable long. Thus, T3 provides an edge to PR1 215 only when the register is being loaded from ALU 223 or an ON operation is being performed. In the latter case, the edge will not be provided to PR1 215 if PR0 213 contains an RR instruction, if there is a protection fault, or if there is an address translation fault.

8. Implementation of IA 231, HR 801, and ISA 803: FIGS. 13 and 13A

FIG. 13 is a schematic of the implementation of IA 231 in a present embodiment. IA 231 is adapted to retaining and incrementing the 24-bit addresses employed by CPU 201 in a present embodiment. IA 231 consists of five four-bit loadable up-down counters, which contain bits 1 through 19 of the address, and a PAL, which contains bits 20 through 23. The up-down counters are set up to count up by 1 when they are enabled and receive a carry bit from the counter to the right which that counter produces when it rolls over. The PAL is programmed as a loadable counter which increments bits 20 through 23 by 2 when it is enabled and provides a carry signal to the counter to the left when it rolls over. The counters and the PAL thus function together as a 24-bit counter which, when enabled, responds to a count signal by incrementing its current value by 2.

The control inputs for IA 231 which are important for the present discussion are the NOT LOAD input, which permits loading of IA 231 from bus 239 when low, the NOT CEP input, which enables counting when low, and the CP input, which provides the pulse to which IA 231 responds by incrementing the address it contains by 2.

The NOT LOAD input is connected to a line carrying the NOT LIA signal, which is high except when the LIA operation is specified in the microinstruction 1001 currently being executed. Thus, IA 231 is loaded only during execution of such a microinstruction. The level of the NOT CEP input is determined by logic 1302, made up of NOR gates 1301, 1303, 1305, and 1307. NOT CEP is low when any input of NOR gate 1305 is high, and is thus low when both inputs of 1307 are low and when all inputs of gate 1303 are low. Beginning with the inputs of NOR gate 1307, NOT OF is low when an OF operation is being performed and FAULT is low if there is no protection fault. Continuing with the inputs of NOR gate 1303, NOT ON is low when an ON operation is taking place, and IFI and FAULT are low if there is neither a protection fault nor an address translation fault. The output of NOR gate 1301 is low if both of the leftmost bits of the first syllable of the instruction stored in PR0 213 are not 0, i.e., if the instruction does not have an RR format 301. Thus, IA 231 is enabled for incrementing when there is an OF operation and no protection fault or when there is an ON operation, no protection or address translation fault, and the syllable in PR0 213 does not have RR format 301.

The actual pulse which causes IA 231 to increment is provided to input CP by logic 1326, made up of inverter 1333, NOR gate 1331, AND gates 1329 and 1337, NOR gate 1335, and D flip flop 1337. Incrementing occurs when CP receives a pulse, i.e. when the input of inverter 1333 receives a pulse. NOR gate 1331 provides a pulse to inverter 1333 only when one of its inputs is low and the other is receiving a pulse. Beginning with the input from AND gate 1329, that input provides a pulse only when the Q output of flip flop 1327 is high and timing signal NOT CPT0 receives a pulse. The Q output of flip flop 1327 is high when NOT LIA is high. i.e., when IA 231 is not being loaded. When NOT LIA is high, the NOT Q output of flip flop 1327 is low and the output of AND gate 1337 is low, setting up the proper condition in NOR gate 1331 for providing the pulse from NOT CPT0 to inverter 1333. In response to the pulse, the PAL increments by 2. If it produces a carry signal, the first counter to the left increments by 1 in response to the pulse and the carry signal; if the first counter produces a carry signal, the second counter increments, and so on through all the counters. Thus, IA 231 is incremented by the pulse from NOT CPT0 only when it is enabled and not being loaded.

Continuing with FIG. 13A and the implementation of HR 801 shown therein, that register is implemented by means of three octal D latches which are set in response to a high ENB input pulse. The pulse is output to HR 801 by logic 1308. The source of the pulse is the CLK input to NAND gate 1311. The gate has two other inputs, one of which is tied high and the other of which is the inverse of the NOT OF signal and is therefore high when a OF operation is being performed. Thus, a pulse corresponding to the CK signal is output to NAND gate 1303 only when the OF operation is being performed. NAND gate 1313's other two inputs carry the NOT LIA and the NOT SIA signals, which are high when IA 231 is neither a source nor a destination for data. Thus, the CK signal produces a pulse at ENB only if data is being neither read to nor written from IA 231 and an OF operation is being performed. Consequently, HR 801 is loaded during the OF operation. Since ENB is also high if either of NOT LIA or NOT SIA is low, HR 801 is also loaded during every LIA and SIA operation.

Continuing with register ISA 803, it is implemented in the same fashion as HR 801. The ENB input receives the output of logic 1310. In logic 1310, the output is produced by NAND gate 1321 and is therefore governed by inputs from NOT SIA and NAND gate 1319. If any of the inputs of NAND gate 1321 is low, ISA 803 is loaded. NOT SIA is low when the SIA operation is being performed, and consequently. ISA 803 is set at that time. The output of NAND gate 1319 is low when its inputs are all high. Of those inputs, NOT TRIO is high except when an operation involving the BNMV branch command experiences an arithmetic overflow, and the input from NOR gate 1323 is high when timing signals CLK2 and CPT3 are both low. Thus, if the output of NAND gate 1317 is also high, the output of NOR gate 1323 will determine when the ENB input receives a pulse. The output of NAND gate 1317 is high if any of its inputs is low. Thus, if the BM signal, indicating a BNM, BNMV, or BNMX operation is high, ISA 803 is loaded, and if NOT LIA is low, indicating a LIA operation, ISA 803 is loaded. Consequently, ISA 803 is loaded when the contents of IA 231 are loaded or stored and at the beginning of execution of a instruction.

9. Conclusion

The foregoing Description of a Preferred Embodiment has disclosed how one skilled in the art may construct and use a prefetcher of the present invention and practice the prefetching method of the present invention. It has further disclosed the construction and use of apparatus for executing instruction of the EXECUTE type and a method for executing those instructions and their subject instruction. While what is disclosed represents the best mode currently known to the inventor of practicing his invention, the preferred embodiment is in all respects exemplary and the invention may be embodied in specific forms other than the one disclosed herein without departing from the spirit or essential characteristics thereof. For example, the invention may be employed with instructions having syllable sizes and formats different from those employed in the preferred embodiment. Similarly, the invention may be employed with EXECUTE instructions which differ in format and in the means by which the subject instruction is specified from the EX instruction disclosed herein. Further, the prefetcher, the address and instruction registers, and the logic controlling them may be implemented in ways differing from those disclosed herein. For example, PR1 215 in a different embodiment may be capable of retaining more than one instruction syllable. Thus, the preferred embodiment described herein is to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. In a digital computer system which includes memory means for providing instructions containing varying numbers of syllables and processor means for executing the instructions,
   instruction prefetch apparatus connected to the processor means for receiving at least one prefetched the syllable of an instruction prefetched from the memory means concurrently with the execution of another instruction in the processor means, the instruction prefetch apparatus comprising:
   (1) prefetched syllable retention means connected to the memory means for receiving and retaining the prefetched syllables and including separately loadable prefetched first syllable retention means and prefetched other syllable retention means, the prefetched first syllable retention means and the prefetched other syllable retention means each having an input coupled together in parallel to the memory means for receiving the prefetched syllables therefrom; and
   (2) prefetch control means connected to the prefetched syllable retention means for causing the prefetched first syllable retention means to receive only the prefetched first syllable of an instruction and the prefetched other syllable retention means to receive any prefetched other syllables of the instruction, each one of the prefetched other syllables being received in turn in the prefetched other syllable retention means and the prefetched first syllable remaining in the prefetched first syllable retention means while the prefetched other syllable retention means receives the prefetched other syllables.

2. In the instruction prefetch apparatus of claim 1 and wherein the prefetched other syllable retention means retains only one other syllable at a time.

3. In the instruction prefetch apparatus of claim 1 and wherein:
   certain of the instructions contain only a first syllable and the first syllable in each of the certain instructions includes a code specifying that the certain instruction contains only the first syllable: and
   the prefetch control means includes means responsive to the code for inhibiting the prefetched other syllable retention means from receiving any syllable during the instruction execution during which the first syllable is prefetched.

4. In the instruction prefetch apparatus of claim 1 and wherein:
   the memory means provides the syllables in response to addresses;
   the instruction prefetch apparatus further includes incrementable prefetch address means for providing the address of the next syllable to be prefetched to the memory means; and
   the prefetch control means causes the prefetch address means to be incremented to specify the next syllable each time a syllable has been prefetched from the memory means.

5. In the instruction prefetch apparatus of claim 4 and wherein:
   certain of the instructions contain only a first syllable and the first syllable of each of the certain instructions includes a code specifying that the instruction contains only a first syllable; and
   the prefetch control means includes means responsive to the code for inhibiting the incrementable prefetch address means from incrementing again during the instruction execution in which the first syllable is prefetched.

6. In the instruction prefetch apparatus of claim 1 and wherein:
the processor means is microinstruction-controlled;
first certain of the microinstructions specify a first syllable prefetch operation or an other syllable prefetch operation; and
the control means is responsive to the prefetched certain microinstructions and causes the first prefetched syllable retention means to receive and retain a syllable of the prefetched instruction in response to a microinstruction specifying the first syllable prefetch operation and the prefetched other syllable retention means to receive and retain a syllable fetched in response to microinstruction specifying the other syllable prefetch operation.

7. In the instruction prefetch apparatus of claim 6 and wherein:
the memory means provides the instruction syllables in response to addresses;
the instruction prefetch apparatus further includes incrementable prefetch address means for providing the address of the syllable to be prefetched to the memory means and incrementing to specify the next syllable to be prefetched in response to the certain microinstructions.

8. In the instruction prefetch apparatus of claim 7 and wherein:
the prefetch address means further includes instruction address retention mean responsive to the first certain microinstructions for retaining the stored address prior to incrementing when one of the first certain microinstructions specifies the first syllable prefetch operation.

9. In the instruction prefetch apparatus of claim 8 and wherein:
the microinstructions are arranged in microsequences corresponding to the instructions;
second certain microinstructions further specify the commencement of execution of the microsequence corresponding to the prefetched instruction; and
the instruction address retention means includes a first register including control means responsive to the first certain microinstructions for receiving the stored address prior to incrementing when one of the first certain microinstructions specifies the first syllable prefetch operation and
an instruction start address register connected to the first registor and including control means responsive to the second certain microinstructions for receiving the stored address from the first register in response to one of the second certain microinstructions.

10. In the instruction prefetch apparatus of claim 6 and wherein:
the microinstructions are arranged in microsequences corresponding to the instructions;
the processor means includes microsequence selection means;
second certain microinstructions further specify the commencement of execution of the microsequence corresponding to the prefetched instruction;
the first syllable includes a first part containing an operation code and a second part containing specifiers required for the duration of the operation specified by the operation code; and
the instruction prefetch means further includes
means connected between the microsequence selection means and the prefetched first syllable retention means and responsive to the second certain microinstructions for providing the first part to the microsequence selection means in response to on of the second certain microinstructions and
specifier register means connected to the prefetched first syllable retention means and responsive to the second certain microinstructions for receiving the specifiers in response to one of the second certain microinstructions.

11. In the instruction prefetch apparatus of claim 1 and wherein:
the memory means further provides data including the instructions in response to addresses;
the processor means further includes register means controlled by register control means and ALU means connected to the register means;
the other syllable specifies a memory address by means of a base specifier specifying one of the register means and a displacement value;
the portion of the prefetched other syllable retention means containing the base specifier is connected to the register control means and selects a register means for output to the ALU means;
the portion of the prefetched other syllable retention means containing the displacement value is connected to the ALU means; and
during execution of the prefetched instruction, the ALU means computes the address specified in the other syllable presently contained in the prefetched other syllable retention means by receiving the content of the register specified by the base specifier and the displacement value and adding the register contents and the displacement value.

12. In a digital computer system which includes memory means for providing instructions containing varying numbers of syllables and processsor means for executing the instructions,
a method of prefetching at least one syllable of an instruction from the memory means concurrently with the execution of another instruction in the processor means, comprising the steps of:
prefetching the first syllable of the instruction and storing it in prefetched first syllable retention means for storing only first syllables of instructions; and
prefetching any other syllables of the instruction, each of the other syllables being received and stored in turn in prefetched other syllable retention means for storing syllables of instructions other than the first syllables, the prefetched first syllable retention means and the prefetched other syllable retention means being coupled in parallel to the memory means such that the prefetched first syllable remains in the prefetched first syllable retention means while the prefetched other syllable retention means receives the prefetched other syllables.

13. In the method of claim 12 and wherein:
the prefetched other syllable retention means retains only a single other syllable; and
the step of receiving each of the other syllables in turn and storing each received other syllable in the prefetched other syllable retention means is performed by receiving each other syllable into the prefetched other syllable retention means, retaining the received other syllable therein until no longer required for execution of the instruction, and thereupon receiving the next other syllable until all of the other syllables have been received.

14. In the method of claim 13 and further comprising the step of:

during execution of the instruction, but after all syllables of the instruction have been prefetched, performing for a next instruction following the instruction being executed the step of prefetching the first syllable of the next instruction and, in the step of prefetching each of the other syllables in turn, prefetching only the first one of the other syllables of the next instruction until execution of the instruction is completed.

15. In the method of claim 12 and wherein:

the memory means provides the syllables in response to addresses; and each step includes the step of incrementing a prefetch address to specify the next syllable to be prefetched.

16. In the method of claim 15 and further comprising the step of:

retaining the prefetch address used to prefetch the first syllable of the instruction while the prefetched instruction is being executed.

17. In a digital computer system which includes memory means for providing data including instructions in response to addresses and processor means for executing the instructions, prefetching apparatus coupled to the processor means and adapted for use with an execute instruction, the execute instruction specifying that a single subject instruction be executed following the execution of the execute instruction and including a specification of the address of the subject instruction, the prefetching apparatus comprising:

(1) prefetch means coupled to the memory means and including means for storing an instruction address used to specify the next instruction to be executed when the next instruction is not a subject instruction, the prefetch means further including means for storing a second address, and the prefetch apparatus further including (2) instruction prefetch control means, being responsive to an occurrence of an execute instruction, and including means for causing the processor means to compute the address specification in the execute instruction, the instruction prefetch control means further including:

means, coupled to the prefetch means, for causing the prefetch means to set the second address storage means to the address of the subject instruction, means, coupled to the prefetch means, for causing the prefetch means to fetch the subject instruction using the address stored by the second address storage means, means, coupled to the prefetch means, for causing the prefetch means to retain the subject instruction without changing the value of the instruction address so that a next instruction, following the execute instruction, is executed immediately after the subject instruction is executed, and means, coupled to the prefetch means, for causing the prefetch means to respond to instructions other than the execute instruction by causing the prefetch means to fetch the instruction specified by the means for storing the instruction address.

18. In the apparatus of claim 17 and wherein:

certain subject instructions are longer than the capacity of the prefetch means;

the instruction prefetch control means further includes execute state retention means for retaining an execute state indicating whether the instruction currently being executed is a subject instruction; and the instruction prefetch control means further includes:

means, responsive to the occurrence of an execute instruction, for setting the execute state to indicate that the instruction currently being executed is a subject instruction, means, responsive to any other instruction when the other instruction is longer than the prefetch means and the execute state indicates that the current instruction is a subject instruction, for causing the prefetch means to set the second address storing means to specify succeeding portions of the subject instruction, means for fetching the succeeding portions of the subject instruction into the prefetch means without changing the value of the stored instruction address until all portions of the subject instruction have been fetched, and means, responsive to all portions of the subject instruction being fetched, for causing the prefetch means to fetch the instruction specified by the stored instruction address.

19. In the prefetching apparatus of claim 17 and wherein:

the processer means includes data retention means connected to the memory means for receiving and retaining data independently of the prefetch means;

the prefetch means is further connected to the data retention means; and the instruction prefetch control means includes means for causing the data retention means to receive the subject instruction from the memory means, and further includes means for causing the prefetch means to fetch the subject instruction from the data retention means.

20. In a digital computer system which includes memory means for providing data including instructions in response to addresses, processor means for executing the instructions, and prefetch means for retaining an instruction prior to execution thereof, the prefetch means including an instruction address specifying the next instruction to be fetched into the prefetch means, the method of executing an execute instruction which specifies that a single subject instruction be executed following the execution of the execute instruction and which includes a specification of the address of the subject instruction, the method comprising the steps of:

setting the instruction address to specify the instruction following the execute instruction;

computing the address of the subject instruction in the processor means using the address specification from the execute instruction;

fetching the subject instruction into the processor means and loading the prefetch means therewith without altering the instruction address; and during execution of the subject instruction, loading the prefetch means using the instruction address.

21. In the method of claim 20 and wherein:

certain subject instructions are longer than the capacity of the prefetch means;

when the subject instruction is one of the certain instructions, the step of fetching the subject instruction into the processor means is performed by repeating the steps of executing the subject instruction portion currently in the prefetching means, fetching a next subject instruction portion, and loading the prefetch means therewith without altering the instruction address until the last portion of the subject instruction has been loaded and executed; and the step of loading the prefetch means using the instruction address is performed during execution of the last portion of the subject instruction to be loaded into the prefetch means.

* * * * *

UNITED STATES PATENT AND TRADEMARK OFFICE
CERTIFICATE OF CORRECTION

PATENT NO. : 5,062,036
DATED : October 29, 1991
INVENTOR(S) : Barrow, et. al.

It is certified that error appears in the above-indentified patent and that said Letters Patent is hereby corrected as shown below:

Claim 1, Col. 20, line 7, delete the first occurrence of the word "the".

Claim 1, Col. 20, line 16, delete "first".

Claim 9, Col. 21, line 50, delete "registor" and insert --register--.

Claim 10, Col. 22, line 6, delete "on" and insert --one--therefor.

Claim 17, Col. 23, line 47, after "address" insert --of the subject instruction using the address--.

Signed and Sealed this

Ninth Day of November, 1993

Attest:

BRUCE LEHMAN

*Attesting Officer*　　　*Commissioner of Patents and Trademarks*